(12) United States Patent
Minami

(10) Patent No.: US 7,772,339 B2
(45) Date of Patent: Aug. 10, 2010

(54) ELECTROPHORETIC PARTICLES AND PRODUCTION PROCESS THEREOF

(75) Inventor: Masato Minami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/138,524

(22) Filed: May 27, 2005

(65) Prior Publication Data

US 2005/0267263 A1    Dec. 1, 2005

(30) Foreign Application Priority Data

May 31, 2004  (JP) ............................ 2004-161687
Jun. 1, 2004  (JP) ............................ 2004-163364
Jun. 9, 2004  (JP) ............................ 2004-171350

(51) Int. Cl.
C08F 4/00    (2006.01)
C08F 4/28    (2006.01)
C08F 10/14   (2006.01)
C08G 18/63   (2006.01)

(52) U.S. Cl. .................... 526/204; 526/227; 526/348.2; 524/700

(58) Field of Classification Search ................. 526/227, 526/348.2, 204; 524/700
See application file for complete search history.

(56) References Cited

U.S. PATENT DOCUMENTS 5,298,833 A    3/1994  Hou ........................... 313/483
6,194,480 B1   2/2001  Takeda et al. ................. 522/75
6,337,358 B1 * 1/2002  Whitehouse et al. ......... 523/200
6,741,386 B2   5/2004  Minami ....................... 359/296
2003/0030884 A1  2/2003  Minami
2005/0227155 A1  10/2005  Minami ........................ 430/37
2005/0267235 A1  12/2005  Minami ....................... 523/201
2005/0267262 A1  12/2005  Wagman et al. ............. 524/556

FOREIGN PATENT DOCUMENTS

JP    09-508216    8/1997
JP    2003-212913  7/2003

* cited by examiner

*Primary Examiner*—William K Cheung
(74) *Attorney, Agent, or Firm*—Fitzpatrick, Cella, Harper & Scinto

(57) ABSTRACT

A process for producing electrophoretic particles containing core particles includes a step of forming the core particles by polymerization of a composition comprising a colorant, a first polymerizable monomer, a second polymerizable monomer having a functional group which is capable of reacting with a living radical polymerization initiation group precursor, and a polymerization initiator; a step of providing a living radical polymerization initiation group at a surface of each core particle by reacting a compound having the living radical polymerization initiation group precursor with the functional group; and a step of providing a polymer chain to the living radical polymerization initiation group by living radical polymerization.

2 Claims, 5 Drawing Sheets

(a)

1g 1eb 1ew 1f 1a 1c (b)

ELECTROPHORETIC PARTICLES AND PRODUCTION PROCESS THEREOF

FIELD OF THE INVENTION AND RELATED ART

The present invention relates to electrophotographic particles used in an electrophoretic display device and a process for producing the electrophoretic particles.

In recent years, with development of information equipment, the needs for low-power and thin display devices have grown, so that extensive study and development have been made on display devices fitted to these needs.

In the electrophoretic display device, a multiplicity of electrophoretic particles which are positively charged and colored are dispersed in a space between a pair of substrates, each provided with an electrode, together with an electrophoretic dispersion liquid which is filled in the space and colored a color different from the color of the electrophoretic particles. In the space, a partition wall is formed so that it divides the space into a multiplicity of pixels along a planar direction of the substrates. By forming such a partition wall, it is possible to define the space between the pair of substrates while preventing localization of the electrophoretic particles.

In such an electrophoretic display device, when a positive-polarity voltage is applied to an observer's side electrode and a negative-polarity voltage is applied to an electrode on an opposite side, the positively charged electrophoretic particles are collected so as to cover the opposite side electrode, so that a color identical to the color of the electrophoretic dispersion medium is displayed when the electrophoretic display device is observed from the observers side.

On the other hand, when a negative-polarity voltage is applied to the observer's side electrode and a positive-polarity voltage is applied to the opposite side electrode, the positively charged electrophoretic particles are collected so as to cover the observer's side electrode, so that a color identical to the color of the electrophoretic particles is displayed when the electrophoretic display device is observed from the observer's side.

By performing such a drive of the electrophoretic display device on a pixel-by-pixel basis, any image or character is displayed by a multiplicity of pixels.

With respect to a production process of the particles, several proposals have been mode (Japanese Laid-Open Patent Application (JP-A) Tokkai 2003-212913, JP-A Tokuhyo Hei 9-508216, and U.S. Pat. No. 6,194,488).

However, as the electrophoretic particles for use in the electrophoretic display device, further improvements in uniformity of particle size and dispersibility have been required.

SUMMARY OF THE INVENTION

An object of the present invention is to provide a process, for producing electrophoretic particles, having solved the above described problems.

A specific object of the present invention is to provide electrophoretic particles excellent in uniformity of particle size and dispersibility.

Another object of the present invention is to provide a process for producing the electrophoretic particles and an electrophoretic display device using the electrophoretic particles.

(1) First Invention

According to a first aspect of the present invention, there is provided a process for producing electrophoretic particles containing core particles, comprising:

a step of forming the core particles by polymerization of a composition comprising a colorant, a first polymerizable monomer, a second polymerizable monomer having a functional group which is capable of reacting with a living radical polymerization initiation group precursor, and a polymerization initiator, a step of providing a living radical polymerization initiation group at a surface of each core particle by reacting a compound having the living radical polymerization initiation group precursor with the functional group, and a step of providing a polymer chain to the living radical polymerization initiation group by living radical polymerization.

According to the first aspect of the present invention, there is provided a process for producing electrophoretic particles containing core particles, comprising:

a step of forming the core particles by polymerization of a composition comprising a colorant, a first polymerizable monomer, a second polymerizable monomer having a functional group which is capable of reacting with a nitroxide-mediated polymerization initiation group precursor, and a polymerization initiator, a step of providing a living radical polymerization initiation group at a surface of each core particle by reacting a compound having the nitroxide-mediated polymerization initiation group precursor with the functional group, and a step of providing a polymer chain to the nitroxide-mediated polymerization initiation group by nitroxide-mediated polymerization.

In a preferred embodiment, the electrophoretic particles comprises core particles which comprise a colorant and a polymer, wherein at a surface of each of the core particles, a polymer chain is grafted by a living radical polymerization of a living radical polymerization initiation group.

In a preferred embodiment, the electrophoretic particles comprises core particles which comprise a colorant and a polymer, wherein at a surface of each of the core particles, a polymer chain is grafted by a nitroxide-mediated polymerization of a nitroxide-mediated polymerization initiation group.

(2) Second Invention

According to a second aspect of the present invention, there is provided a process for producing electrophoretic particles containing core particles, comprising:

(a) a step of forming the core particles by dispersion polymerization in which a composition comprising a colorant, a first polymerizable monomer, a second polymerizable monomer having a functional group which is capable of reacting with a living radical polymerization initiation group precursor, and a polymerization initiator is dissolved or dispersed in a reaction solvent, (a') a step of providing a living radical polymerization initiation group at a surface of each core particle by reacting a compound having the living radical polymerization initiation group precursor with the functional group, and (b) a step of providing a polymer chain to the living radical polymerization initiation group through living radical polymerization by adding a third polymerizable monomer providing the polymer chain in a state in which the core particles are dispersed in the reaction solvent (grafting step).

According to the second aspect of the present invention, there is also provided a process for producing electrophoretic particles containing core particles, comprising:

(a) a step of forming the core particles by dispersion polymerization in which a composition comprising a colorant, a first polymerizable monomer, a fourth polymerizable monomer having a living radical polymerization initiation group, and a polymerization initiator is dissolved or dispersed in a reaction solvent, and (b) a step of providing a polymer chain to the living radical polymerization initiation group through living radical polymerization by adding a third polymerizable monomer providing the polymer chain in a state in which the core particles are dispersed in the reaction solvent (grafting step).

In a preferred embodiment, the electrophoretic particles comprising core particles, wherein the core particles contains a colorant and a polymer and have an average particle size of 1-10 µm and a coefficient of variation, of a particle distribution, of not more than 15%, and at a surface of each core particle, a polymer chain having a molecular weight distribution index (weight-average molecular weight/number-average molecular weight) of not more than 1.8 is formed.

According to the second aspect of the present invention, there is provided an electrophoretic display device, comprising:

electrophoretic particles comprising core particles which contains a colorant and a polymer and have an average particle size of 1-10 µm and a coefficient of Valiation, of a particle distribution, of not more than 15%, and at a surface of each core particle, a polymer chain having a molecular weight distribution index (weight-average molecular weight/number-average molecular weight) of not more than 1.8 is formed;

a dispersion medium for dispersing the electrophoretic particles; and a cell in which the electrophoretic particles and the dispersion medium are filled.

(3) Third Invention

According to a third aspect of the present invention, there is provided a process for producing electrophoretic particles containing core particles, comprising:

a step of forming agglomeration particles by mixing a polymer dispersion liquid in which polymer particles having a functional group is dispersed and a colorant dispersion liquid in which a colorant is dispersed, thereby to agglomerate the polymer particles and the colorant, a step of forming composite particles, comprising the polymer particles and the colorant, by heat-melting the agglomeration particles, a step of providing a living radical polymerization initiation group to the functional group of the composite particles, and a step of providing a polymer chain to the living radical polymerization initiation group by living radical polymerization.

According to the third aspect of the present invention, there is also provided a process for producing electrophoretic particles containing core particles, comprising:

a step of forming agglomeration particles by mixing a polymer dispersion liquid in which polymer particles having a living radical polymerization initiation group is dispersed and a colorant dispersion liquid in which a colorant is dispersed, thereby to agglomerate the polymer particles and the colorant, a step of forming composite particles, comprising the polymer particles and the colorant, by heat-melting the agglomeration particles, and a step of providing a polymer chain to the living radical polymerization initiation group of the composite particles by living radical polymerization.

In a preferred embodiment, the electrophoretic particles comprises composite particles obtained by agglomerating and melting a colorant and polymer fine particles having a functional group, wherein each of the composite particles has a living radical polymerization initiation group at a surface thereof and the living radical polymerization initiation group is connected with a polymer chain.

According to the third aspect of the present invention, there is further provided an electrophoretic display device, comprising:

electrophoretic particles comprising composite particles obtained by agglomerating and melting a colorant and polymer fine particles having a functional group, each of the composite particles having a living radical polymerization initiation group at a surface thereof, which is connected with a polymer chain, a dispersion medium for dispersing the electrophoretic particles, and a cell in which the electrophoretic particles and the dispersion medium are held.

The above described electrophoretic particles according to the first to third aspects of the present invention are excellent in particle size uniformity and dispersibility.

These and other objects, features and advantages of the present invention will become more apparent upon a consideration of the following description of the preferred embodiments of the present invention taken in conjunction with the accompanying drawings.

Figure 1:
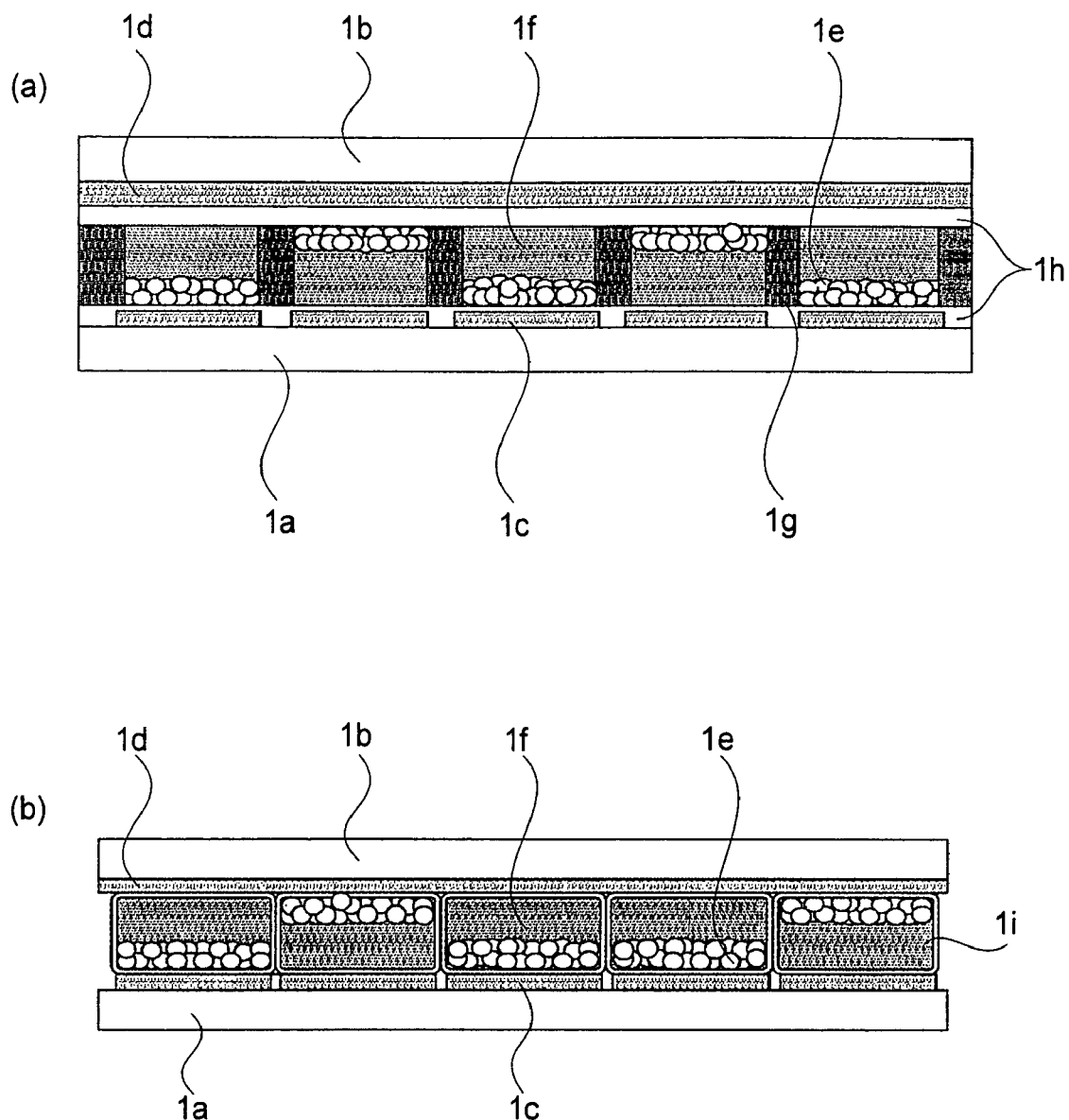
FIGS. 1(a) and 1(b) are schematic sectional views showing an embodiment of an electrophoretic display device using electrophoretic particles of the present invention.

DETAILED DESCRIPTION OF THE PREFERRED EMBODIMENTS (1) Embodiments According to First Invention In an embodiment according to the first aspect of the present invention electrophoretic particles are particles each of which comprises a composite fine particle, as a core, containing a colorant and a polymer and has a polymer chain-grafted surface, and are prepared by incorporating a polymerizable monomer having a functional group which is capable of reacting with a precursor of a living radical) polymerization initiation group into a core-forming starting material in advance, introducing the living radical polymerization initiation group into a functional group formed at the core surface, and grafting the polymer chain from the living radical polymerization initiation group through living radical polymerization.

As the living radical polymerization initiation group, an atom transfer radical polymerization initiation group is used, the polymer chain is grafted from the atom transfer radical polymerization initiation group present at the core surface by atom transfer radical polymerization.

In an embodiment according to the first aspect of the present invention electrophoretic particles are particles each of which comprises a composite fine particle, as a core, containing a colorant and a polymer and has a polymer chain-grafted surface, and are prepared by incorporating a polymerizable monomer having a functional group which is capable of reacting with a precursor of a nitroxide-mediated polymerization initiation group into a core-forming starting material in advance, introducing the nitroxide-mediated polymerization initiation group into a functional group formed at the core surface, and grafting the polymer chain from the nitroxide-mediated polymerization initiation group through nitroxide-mediated polymerization.

(Formation of Core Particles)

Hereinbelow, composite fine particles containing a colorant and a polymer as a core and a production process thereof will be described.

In a composite fine particle core comprising the colorant and the polymer, the colorant may be completely contained in the polymer or partially present at the surface of polymer particle. The colorant is representatively particles principally comprising a pigment (hereinafter, referred to as "pigment particle(s)") and one or plurality of pigment particles are contained in the core so as to color the core.

In order to produce the composite fine particle core, first of all, a colorant, a polymerizable monomer for the core, a polymerizable monomer having a functional group capable of reacting with a living radical polymerization initiation group precursor or a nitroxide-mediated polymerization initiation group, and a polymerization initiator are prepared. Hereinafter, these are inclusively referred to as a "core composition". The polymerizable monomer for the core may be identical to the polymerizable monomer having the above described functional group.

The polymerizable monomer for the core contained in the core composition contains therein the colorant uniformly dispersed or dissolved and is a principal constitutional element constituting the core particles after polymerization. A specific material of the polymerizable monomer for the core is described later.

The other polymerizable monomer having the functional group is, as described above, A. the polymerizable monomer having the functional group capable of reacting with the living radical polymerization initiation group precursor, or
B. the polymerizable monomer having the functional group capable of reacting with the nitroxide-mediated polymerization initiation group.

These polymerizable monomers are selectively used depending on whether a graft polymerization process after the core particles are formed in atom transfer radical polymerization or nitroxide-mediated polymerization.

As the functional group-containing polymerizable monomer A, ethylene glycol (meth-)acrylate represented by the following formula (1-I) is preferably used.

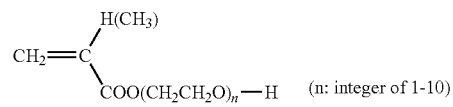

Formula (1-I)

In this case, as the core polymerizable monomer constituting the core composition together with the polymerizable monomer A, it is possible to use styrene, methyl methacrylate, and the like.

As the functional group-containing polymerizable monomer A<4-ethyl styrene. In this case, 4-ethyl styrene may preferably be used also as the core polymerizable monomer.

The above described core composition is placed in an aqueous suspension medium and stirred for suspension. In this case, the core composition is dispersed as droplets in the suspension medium and formed into particles having a particle size close to a desired particle size under an appropriate stirring condition. As stirring apparatus, it is possible to use a dispersing apparatus, such as a homogenizer, a homomixer, a line mixer, or the like.

In the suspension medium, a suspension stabilizer is contained. As desired, a surfactant such an anionic surfactant, a cationic surfactant, a nonionic surfactant, an amphoteric surfactant, or the like may be added therein.

The resultant suspension liquid is polymerized in an atmosphere of inert gas, such as nitrogen (gas), argon (gas), and the like. A polymerization temperature varies depending on the kind of polymerization initiator used but may preferably be in the range of about 50-90° C. A polymerization time may preferably be 0.5-30 hours, more preferably 2-10 hours. As a result of the polymerization, colorant-containing particles as the core are obtained.

As described above, from the composition containing the colorant and the polymerizable monomers, polymer particles are formed, so that it is possible to obtain core particles which have a uniform particle size and are spherical. It is also possible to easily adjust color and a concentration of the core particles.

Hereinbelow, materials used for producing the above described core particles will be described more specifically.

(Colorant)

As the colorant, it is possible to use a pigment or a dye singly or in combination. When the pigment and the dye are used in combination, a mixing ratio may be determined appropriately depending on a system used.

As the pigment, it is possible to use an organic pigment, an inorganic pigment, etc.

Examples of organic pigment may include azo pigments, phthalocyanine pigments, quinacridone pigments, isoindolinone pigments isoindolin pigments, dioxazine pigments, perylene pigments, perinone pigments, thioindigo pigments, quinophthalone pigments, anthraquinone pigments, nitro pigments, and nitroso pigments. Specific examples thereof may include: red pigments, such as Quinacridone Red, Lake Red, Brilliant Carmine, Perylene Red, Permanent Red, Toluidine Red and Madder Lake; green pigments, such as Diamond Green Lake, Phthalocyanine Green, and Pigment Green; blue pigments, such as Victoria Blue Lake, Phthalocyanine Blue, and Fast Sky Blue; yellow pigments, such as Hansa Yellow, Fast Yellow, Disazo Yellow, Isoindolinone Yellow, an Quinophthalone Yellow; and black pigments, such as Aniline Block and Diamond Black.

Examples of the inorganic pigment may include: white pigments, such as titanium oxide, aluminum oxide, zinc oxide, lead oxide, and zinc sulphide; black pigments, such as carbon black, manganese ferrite block, cobalt ferrite black, and titanium black; red pigments, such as cadmium red, red iron oxide, and molybdenum red; green pigments, such as chromium oxide, viridian, titanium cobalt green, cobalt green, and victoria green; blue pigments, such as ultramarine blue, prussian blue, and cobalt blue; and yellow pigments, such as cadmium yellow, titanium yellow, yellow iron oxide, chrome yellow, and antimony yellow.

The pigment may preferably have an average particle size of 10-500 nm, more preferably 20-200 nm. Below 10 nm, a handling characteristic is undesirably lowered considerably. Above 500 nm, a degree of pigmentation of the pigment is desirably lowered and the resultant particles are unsuitable for electrophoretic particles of a smaller size.

The pigment may preferably be added in an amount of 0.1-30 wt. %, more preferably 1-15 wt. %, with respect to the polymerizable monomer for the core.

The pigment generally has a poor dispersibility, so that when the pigment is dispersed in the polymerizable monomer for the core, the pigment may preferably be dispersed therein after being subjected to surface modification, e.g., in a conventionally known manner.

In the case of using the pigment as the colorant, the dispersion can be performed by a shearing-type dispersion apparatus, such as a homogenizer, a homomixer, a biomixer, and the like; a media-type dispersion apparatus, such as a ball mill, an atriter, a sand mill, and the like; an ultrasonic dispersion apparatus; etc.

As the dye in the case of using it as the colorant, a material therefor is not particularly limited so long as it is soluble in the polymerizable monomer for the core but is not soluble in water or an electrophoretic dispersion medium. Examples of the dye may include those of equalysine-type, azine-type, azo-type, azomethine-type, anthraquinone-type, indigo-type, xanthene-type, dioxazine-type, diphenylmethane-type, thiazine-type, thiazole-type, thioindigo-type, triphenyl-methane-type, polymethine-type, and the like. These dyes may be used singly or in combination of two or more species.

The dye may preferably added in an amount of 0.1-30 wt. %, more preferably 1-20 wt. % with respect to the polymerizable monomer for the core.

(Polymerizable Monomer for Core)

As the for the polymerizable monomer for the core, it is possible to use various vinyl monomers. Examples thereof may include: styrene-based monomers, such as styrene, 2-methyl styrene, 3-methyl styrene, 4-methyl styrene, 2-ethyl styrene, 3-ethyl styrene, 4-ethyl styrene, 2-propyl styrene, 3-propyl styrene, 4-propyl styrene, 2-isopropyl styrene, 3-isopropyl styrene, 4-isopropyl styrene, 4-tert-butyl styrene, 2,3-dimethyl styrene, 3,4-dimethyl styrene, 2,4-dimethyl styrene, 2,6-dimethyl styrene, 2,3-diethyl styrene, 3,4-diethyl styrene, 2,4-diethyl styrene, 2,6-diethyl styrene, 2-methyl-3-ethyl styrene, 2-methyl-4-ethyl styrene, α-methyl styrene, and 4-phenyl styrene; (meth-)acrylate monomers, such as methyl (meth-)acrylate, ethyl (meth-)acrylate, propyl (meth-)acrylate, isopropyl (meth-)acrylate, and n-butyl (meth-)acrylate; vinyl ether monomers, such as vinyl methyl ether, vinyl ethyl ether, and vinyl isobutyl ether; vinyl ketone monomers, such as vinyl methyl ketone, vinyl ethyl ketone, and vinyl hexyl ketone; N-vinyl compound monomers, such as N-vinyl pyrrole, N-vinylcarbazole, N-vinylindole, and N-vinyl pyrrolidone; vinyl acetate; (meth-)acrylonitrile; and (meth-)acrylamide. These monomers may be used singly or in combination of two or more species.

Further, it is also possible to use a cross linking agent, as desired, in combination with the polymerizable monomer for the core. Examples thereof may include: compounds, such as divinylbenzene, divinylnaphthalene, ethylene glycol di-(meth-) acrylate, diethylene glycol di-(meth-)acrylate, triethylene glycol di-(meth-)acrylate, tetraethylene glycol di-(meth-)acrylate, trimethylolpropane triacrylate, allyl (meth-)acrylate, 1,3-butanediol di-(meth-)acrylate, N,N-divinylaniline, and divinyl ether. These compounds may be used singly or in combination of two or more species.

(Suspension Stabilizer)

As a suspension stabilizer contained in the above described aqueous suspension medium, it is possible to use compounds including: phosphate, such as calcium phosphate, magnesium phosphate, and aluminum phosphate; pyrophosphates, such as calcium pyrophosphate, magnesium pyrophosphate, aluminum pyrophosphate, and zinc pyrophosphate; poorly water-soluble inorganic compounds, such as calcium carbonate, magnesium carbonate, calcium hydroxide, magnesium hydroxide, aluminum hydroxide, calcium sulphate, barium sulphate, and colloidal silica; and water-soluble polymers, such as polyvinyl alcohol, carboxymethyl cellulose, hydroxyethyl cellulose, methyl cellulose, starch, and sodium polyacrylate.

The suspension stabilizer may preferably be added in an amount of 0.01-30 wt. %, more preferably 0.1-20 wt. % with respect to the core composition.

(Surfactant)

As the surfactant added into the suspension medium, as desired, it is possible to use the anionic surfactant, the cationic surfactant, the nonionic surfactant, the amphoteric surfactant, etc., as described above.

As the anionic surfactant, it is possible to use alkyl sulphate, alkyl sulfonate, fatty acid salt, polyoxyethylene alkylphenyl ether sulphate, polyoxyethylene alkyl sulphate, alkylnaphthalene sulfonate, alkane sulfonate, alkyl phosphate, etc.

As the cationic surfactant, it is possible to use alkylamine salt, quaternary ammonium salt, etc.

As the nonionic surfactant, it is possible to use polyoxyethylene alkylphenyl ether, polyoxyethylene alkyl ether, polyoxyethylene fatty acid ester, sorbitan fatty acid ester, polyoxysorbitan fatty acid ester, glycerin fatty acid ester, etc.

As the amphoteric surfactant, it is possible to use lauryldimethylamine oxide.

The surfactant may preferably be added in an amount of 0.1-10 wt. %, more preferably 0.05-5 wt. %, with respect to the polymerizable monomer for the core.

In order to prevent coalescence of the polymerized particles, a thickness such as glycerin, ethylene glycol, or the like may also be added in the suspension medium, as desired.

(Polymerization Initiator)

As the polymerization initiator, it is possible to use an oil-soluble azo-type or peroxide-type initiator generally used in suspension polymerization. Examples thereof may include: the azo-type initiators, such as 2,2'-azobisisobutylonitrile, 2,2'-azobis-2,4-dimethylvaleronitrile, 2,2'-azobis-2-methylbutyronitrile, 2,2'-azobis-2,3-dimethylbutyronitrile, 2,2'-azobis-2,3,3-trimethylbutyronitrile, and 2,2'-azobis-2-isopropylbutyronitrile; and the peroxide-type initiators, such as benzoyl peroxide, orthochrolo benzoyl peroxide, orthomethoxy benzoyl peroxide, lauroyl peroxide, octanoyl peroxide, and methyl peroxide; etc.

The polymerization initiator may preferably be used in an amount of 0.1-10 wt. % with respect to the polymerizable monomers including the polymerizable monomer for the core and the functional group-containing polymerizable monomer.

(Introduction of Polymerization Initiation Group)

Each of the above prepared core particles has a functional group, at it surface or therein, which is derived from the above described functional group-containing polymerizable monomer A or B and is capable of reacting with:

A'. a living radical polymerization initiation group precursor, or

B'. a nitroxide-mediated polymerization initiation group.

The functional group of each core particle is reacted with the polymerization initiation group precursor A' or the polymerization initiation group B' to add the polymerization initiation group to the core particle. The added polymerization initiation group is different depending on whether a subsequent living radical polymerization is atom transfer radical polymerization or nitroxide-mediated polymerization, so that a corresponding reaction is also different as described below.

In the case where the living radical polymerization is the atom transfer radical polymerization, in the above described core particle forming step, core particles are obtained by using the ethylene glycol (meth-)acrylate represented by the above described formula (1-I) as the polymerizable monomer having the functional group and using styrene, methyl methacrylate, or the like as the polymerizable monomer for the core. As a result, at the surface of each of the core particles, hydroxyl group is added. The thus prepared core particle is subjected to any of reaction formulas (1-II) to (1-V) shown below to provide the atom transfer radical polymerization initiation group at the surface thereof.

More specifically, after the core particles are dispersed in the reaction medium, an acid anhydride shown in the reaction formula (1-II) or (1-III) as the precursor of atom transfer radical polymerization initiation group is added in the reaction solvent to effect esterification to provide the atom transfer polymerization initiation group at the surface of each core particle.

Alternatively, the esterification is effected by adding an acid bromide shown in the reaction formula (1-IV) or (1-V) as the precursor of atom transfer radical polymerization initiation group to provide the atom transfer polymerization initiation group at the surface of each core particle.

The reaction solvent is not particularly limited so long as the core particles are dispersed and are not dissolved in the reaction solvent. Examples thereof may include dimethyl sulfoxide, dimethylformamide, tetrahydrofuran, acetonitrile, etc.

Reaction Formula (1-II)

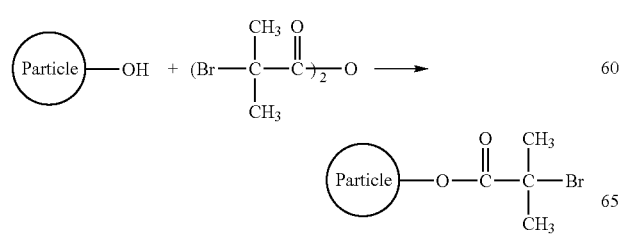

Reaction Formula (1-III)

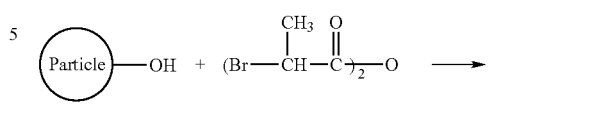

Reaction Formula (1-IV)

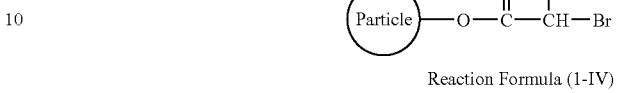

Reaction Formula (1-V)

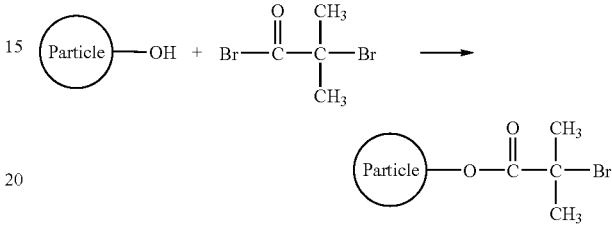

In the case where the living radical polymerization is the nitroxide-mediated polymerization, in the above described core particle forming step, core particles are obtained by using 4-ethyl styrene as the polymerizable monomer having the functional group and using 4-ethyl styrene as the polymerizable monomer for the core. The thus prepared core particle is subjected to a reaction formula (1-VI) shown below to provide the nitroxide-mediated polymerization initiation group at the surface thereof.

Reaction Formula (1-VI)

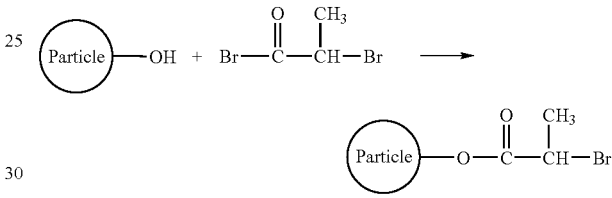

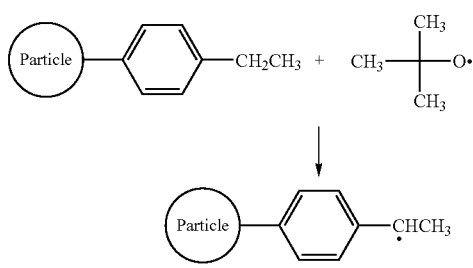

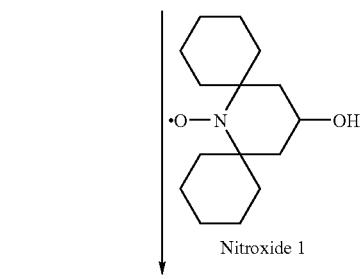

Nitroxide 1

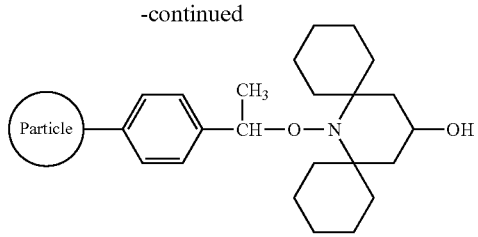

The reaction formula (1-VI) shows such a process that at the surface of core particle dispersed in the reaction solvent, hydrogen of ethyl group located at the core particle surface is drawn by tert-butoxy radical and the remaining radical of the ethyl group reacts with nitroxide 1 to form a nitroxide-mediated polymerization initiation group.

The reaction solvent is not particularly limited so long as the core particles are dispersed and are not dissolved in the reaction solvent. Examples thereof may include dimethyl sulfoxide, dimethylformamide, benzene, toluene, xylene, etc.

In the reaction formula (1-VI), it is also possible to use the following nitroxides 2 to 9 in stead of the nitroxide 1.

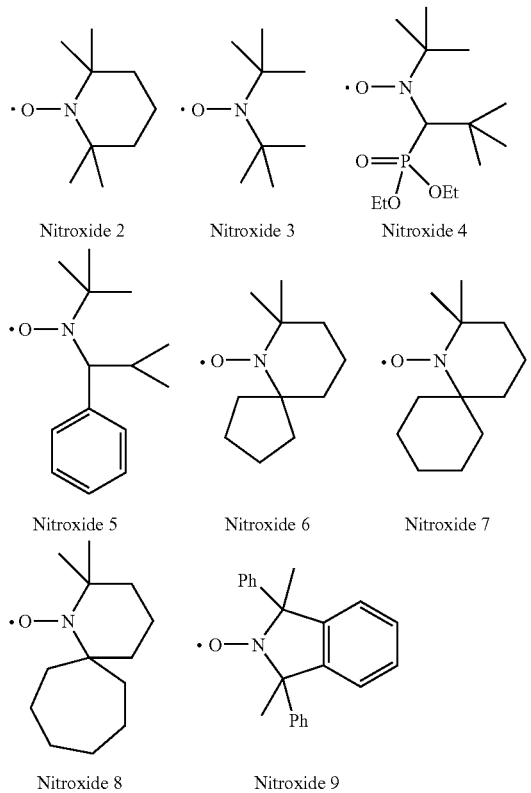

Nitroxide 2  Nitroxide 3  Nitroxide 4

Nitroxide 5  Nitroxide 6  Nitroxide 7

Nitroxide 8  Nitroxide 9

(Formation of Polymer Chain at Core Particle Surface)

As described above, the core particles each having the polymerization initiation group at its surface are prepared.

Then, the living radical polymerization is performed by using the polymerization initiation group at the core particle surface as a reaction start point to form a polymer layer having a uniform polymer chain length at the surface of each core particle. Hereinbelow, this step will be described with respect to the case of the atom transfer radical polymerization and the case of the nitroxide-mediated polymerization.

(Atom Transfer Radical Polymerization)

The case where the living radical polymerization is the atom transfer radical polymerization will be described.

By using, as the core particles, the particles to which the atom transfer radical polymerization initiation group is introduced through the reaction formulas (1-II) to (1-V), it is possible to easily form polymer chains having a uniform chain length at the surfaces of core particles.

After the core particles are dispersed in the reaction solvent, a polymerizable monomer for constituting the polymer chain and a transfer metal complex are added and then an atmosphere of the reaction system is replaced with inert gas to effect the atom transfer radical polymerization.

The reaction solvent is not particularly limited so long as the core particles are dispersed and are not dissolved in the reaction solvent. Examples of the reaction solvent may include dimethyl sulfoxide, dimethylformamide, acetonitrile, pyridine, methanol, ethanol, propanol, butanol, pentanol, hexanol, heptanol, cyclohexanol, methyl cellosolve, ethyl cellosolve, isopropyl cellosolve, butyl cellosolve, acetone, methyl ethyl ketone, methyl isobutyl ketone, cyclohexanone, ethyl acetate, butyl acetate, ethyl propionate, dimethyl ether, diethyl ether, trioxane, tetrahydrofuran, pentane, cyclopentane, hexane, cyclohexane, heptane, octane, nonane, decane, benzene, toluene, xylene, ethylbenzene, methoxybenzene, etc. These may be used singly or in combination of two or more species.

As the inert gas, it is possible to use nitrogen or argon.

The transfer metal complex used comprises halogenated metal and a ligand. As a metal species of the halogenated metal, transfer metal from Ti (atomic member: 22) to Zn (atomic number: 30) are preferred. Of these, Fe, Co, Ni and Cu are further preferred. As the halogenated metal, cuprous chloride and cuprous bromide are particularly preferred.

The ligand is not particularly limited so long as it is capable of coordinating with the halogenated metal. Example thereof may include: 2,2'-bipyridyl, 4,4'-di-(n-heptyl)-2,2'-bipyridyl, 2-(N-pentyliminomethyl) pyridine, (−)-sparteine, tris(2-dimethylaminoethyl)amine, ethylenediamine, dimethylglyoxime, 1,4,8,11-tetramethyl-1,4,8,11-tetraazocyclotetradecane, 1,10-phenanthroline, N,N,N',N'',N''-pentamethyldiethyltriamine, hexamethyl(2-aminoethyl)amine, etc.

The metal transfer complex may preferably be added in an amount of 0.001-10 wt. %, more preferably 0.05-5 wt. %, with respect to the polymerizable monomer constituting the polymer chain.

A polymerization temperature is in the range of 40-100° C., preferably 50-80° C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the atom transfer radical polymerization initiation group fixed at the particle surface is selected. More specifically, with respect to the particles obtained through the reaction formula (1-II), 2-bromo ethyl isobutyrate is preferred. With respect to the particles obtained through the reaction formula (1-III), 2-bromo ethyl propionate is preferred.

After the reaction, the formed particles are washed and recovered by an appropriate method, such as filtration, decantation, centrifugation, or the like, and then are subjected to drying and classification to obtain electrophoretic particles.

(Nitroxide-Mediated Polymerization)

The nitroxide-mediated polymerization will be described.

By using, as the core particles, the particles to which the atom nitroxide-mediated polymerization initiation group is introduced through the reaction formula (1-IV), it is possible to easily form polymer chains having a uniform chain length at the surfaces of core particles.

After the core particles are dispersed in the reaction solvent, a polymerizable monomer for constituting the polymer chain is added and then an atmosphere of the reaction system is replaced with inert gas to effect the atom transfer radical polymerization.

The reaction solvent is not particularly limited so long as the core particles are dispersed and are not dissolved in the reaction solvent. Examples of the reaction solvent may include dimethyl sulfoxide, dimethylformamide, tetrahydrofuran, acetonitrile, benzene, toluene, xylene, etc. Alternatively, the polymerization may be performed without using the reaction solvent.

As the inert gas, it is possible to use nitrogen or argon.

A polymerization temperature is in the range of 40-100° C., preferably 50-90° C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the nitroxide-mediated polymerization initiation group fixed at the particle surface is selected. More specifically, with respect to the particles obtained through the reaction formula (1-VI), NItroxide 1 is preferred.

After the reaction, the formed particles are washed and recovered by an appropriate method, such as filtration, decantation, centrifugation, or the like, and then are subjected to drying and classification to obtain electrophoretic particles.

The electrophotographic particles may preferably have an average particle size of 0.5-10 μm, more preferably 0.5-3 μm. When the average particle size exceeds 10 μm, display at high resolution cannot be performed. When the average particle size is less than 0.5 μm, there arises such an undesirable problem that the electrophoretic particles of the present invention are not readily produced.

The electrophotographic particles may preferably have a concentration of 0.5-50 wt. %, more preferably 1-30 wt. %, per the weight of the electrophoretic dispersion medium although the concentration varies depending on the particle size of the electrophotographic particles.

(Charged Function and Dispersion Function of Polymer Chain)

The electrophoretic particles have an electric charge function and a dispersion function at an outermost core portion, so that these functions are also required with respect to the polymer chain of the particles obtained by the above described living radical polymerization.

First, the dispersion function will be described.

In order to provide the polymer chain with the dispersion function, it is necessary to select a polymer having a high affinity with the electrophoretic dispersion medium. The high affinity means that the polymer chain and the electrophoretic dispersion medium are excellent in mutual solubility without causing phase separation. The polymer chain has a steric-exclusion effect of preventing agglomeration between particles by possessing an expanse in the electrophoretic dispersion medium.

As the polymerizable monomer providing the polymer chain having the dispersion function, as described above, the resultant polymer is required to have the high affinity with the electrophoretic dispersion medium. Examples of the polymerizable monomer may include 1-hexene, 1-heptene, 1-octene, 1-decene, butadiene, isoprene, isobutylene, etc. These may be used singly or in combination of two or more species.

Next, the charge function will be described.

As the polymerizable monomer providing the polymer chain having the charge function, it is possible to use a basic polymerizable monomer, an acidic polymerizable monomer, and a fluorine-containing polymerizable monomer.

Examples of the basic polymerizable monomer may include: methyl (meth-)acrylate, ethyl (meth-)acrylate, propyl (meth-)acrylate, pentyl (meth-)acrylate, hexyl (meth-)acrylate, 2-ethylhexyl (meth-) acrylate, heptyl (meth-)acrylate, octyl (meth)-acrylate, nonyl (meth-)acrylate, decyl (meth-)acrylate, dodecyl (meth-)acrylate, tetradecyl (meth-)acrylate, hexadecyl (meth-)acrylate, octadecyl (meth-)acrylate, aminomethyl (meth-)acrylate, aminoethyl (meth-)acrylate, N,N-dimethylaminomethyl (meth-)acrylate, N,N-dimethylaminoethyl (meth-)acrylate, (meth-)acrylamide, N,N-dimentyl (meth-)acrylamide, N,N-diethyl (meth-)acrylamide, 4-vinylpyridine, etc.

When an acidic additive is added to the polymer chain obtained from the basic polymerizable monomer, an acid-base interaction between these substances are caused to occur, thus imparting positive chargeability to the particles. Further, the polymer chain having the charge function can also have the dispersion function by appropriately selecting the kinds of the basic polymerizable monomer and the acidic additive and by appropriately adjusting an addition amount of the acidic additive, so that it is not necessary to effect grafting of the polymerizable monomer having the dispersion substance to the particle.

As the acidic additive, an acidic substance which is soluble in the electrophoretic dispersion medium is preferred. For example, it is possible to use rosin acid, rosin ester, rosin acid derivative, poly(meth-)acrylic acid, polyisobutylenesuccinic acid anhydride, etc.

An addition amount of the acidic additive may appropriately added depending on the kind thereof but may preferably be 0.001-10 wt. %, preferably 0.01-5 wt. %, with respect to the electrophoretic dispersion medium.

On the other hand, examples of the acidic polymerizable monomer may include: (meth-)acrylic acid, 2-butenoic acid (crotonic acid), 3-butenoic acid (vinylacetic acid), 3-methyl-3-butenoic acid, 3-pentenoic acid, 4-pentenoic acid, 4-methyl-4-pentenoic acid, 4-hexenoic acid, 5-hexenoic acid, 5-methyl-5-hexenoic acid, 5-heptenoic acid, 6-heptenoic acid, 6-methyl-6-heptenoic acid, 6-octenoic acid, 7-octenoic acid, 8-decenoic acid, 9-decenoic acid, 3-phenyl-2-propenoic acid (cinnamic acid), carboxymethyl (meth-)acrylate, carboxyethyl (meth-)acrylate, vinyl benzoic acid, vinylphenyl acetic acid, vinylphenyl propionic acid, maleic acid, fumaric acid, methylenesuccinic acid (itaconic acid), hydroxyl styrene, styrenesulfonic acid, vinyltoluenesulfonic acid, vinylsulfonic acid, sulfomethyl (meth-)acrylate, 2-sufoethyl (meth-)acrylate, 2-propene-1-sulfonic acid, 2-methyl-2-propene-1-sulfonic acid, etc.

When a basic additive is added to the polymer chain obtained from the acidic polymerizable monomer, an acid-base interaction between these substances are caused to occur, thus imparting negative chargeability to the particles. Further, the polymer chain having the charge function can also have the dispersion function by appropriately selecting the kinds of the acidic polymerizable monomer and the basic additive and by appropriately adjusting an addition amount of the basic additive, so that it is not necessary to effect grafting of the polymerizable monomer having the dispersion substance to the particle.

As the basic additive, a basic substance which is soluble in the electrophoretic dispersion medium is preferred. For example, it is possible to use polyisobutylsucccinimide, polyvinyl pyridine, pyridine, lecthin, polyvinyl acetate, polyethylene oxide polymethyl methacrylate, polydecyl methacrylate, polydodecyl methacrylate, polyoctadecyl methacrylate, polyacrylamide, polyester, polyether, etc.

An addition amount of the basic additive may appropriately added depending on the kind thereof but may preferably be 0.001-10 wt. %, preferably 0.01-5 wt. %, with respect to the electrophoretic dispersion medium.

Further, examples of the fluorine-containing polymerizable monomer may include: (meth-)acrylate, 2,2,2-trifluoroethyl (meth-)acrylate, pentafluoroethyl (meth-)acrylate, heptafluoropropyl (meth-)acrylate, 3,3,3-trifluoropropyl (meth-) acrylate, nonafluorobutyl (meth-)acrylate, 3,3,4,4,4-pentafluorobutyl (meth-)acrylate, undecafluoropentyl (meth-)acrylate, 4,4,5,5,5-pentafluoropentyl (meth-)acrylate, tridecafluorohexyl (meth-)acrylate, pentadecafluoroheptyl (meth-)acrylate, etc.

The polymer chain obtained from the fluorine-containing polymerizable monomer has fluorine (atom) which has a large electronegativity, so that it is possible to impart negative chargeability to the particle. The polymer chain has such an affinity with the electrophoretic dispersion medium that it is not so high, thus being preferably one obtained through block polymerization between the fluorine-containing polymerizable monomer and the polymerizable monomer having the dispersion function.

The grafted polymer chain is characterized in that it has a molecular weight distribution index (weight-average molecular weight/number-average molecular weight) which is controlled to be-not more than 1.8, preferably not more than 1.5, further preferably not more than 1.3. When the molecular weight distribution index of the grafted polymer chain exceeds 1.8, it is difficult to say that the chain length of polymer chain is uniform and the electrophoretic particles are undesirably liable to cause unevenness in dispersibility and chargeability.

The number-average molecular weight may appropriately be determined depending on whether the polymer chain is of the dispersion function-type or the charge function-type. In the case where the polymer chain is of the dispersion function-type, the number-average molecular weight may preferably be in the range of 500-1,000,000, more preferably 1,000-500,000. Below 500, it is difficult for the polymer chain to have the dispersion function. Above 1,000,000, the solubility in the electrophoretic dispersion medium is undesirably lowered.

A graft density of the polymer chain can be controlled by a degree of introduction of the living radical polymerization initiation group or the nitroxide-mediated polymerization initiation group. Further, the chain length of the polymer chain can be controlled by the addition amount of the polymerizable monomer, the polymerization time, etc.

(Constitution of Electrophoretic Display Device)

Hereinbelow, an embodiment of an electrophoretic display device using electrophoretic particles of the present invention will be described with reference to the drawings.

FIGS. 1(a) and 1(b) are schematic sectional views each showing an embodiment of the electrophoretic display device using the electrophotographic particles of the present invention.

As shown in FIG. 1(a), the electrophoretic display device includes a first substrate 1a provided with a first electrode 1c a second substrate 1b provided with a second electrode 1d which are disposed opposite to each other with a predetermined spacing through a partition wall 1g. In a cell (space) defined by the pair of first and second substrates 1a and 1b and the partition wall 1g, an electrophoretic dispersion liquid comprising at least electrophoretic particles 1e and an electrophoretic dispersion medium 1f is sealed. On each of the electrodes 1c and 1d, an insulating layer 1h is formed. A display surface of the electrophoretic display device is located on the second substrate 1b side.

FIG. 1(b) shows an electrophoretic display device using microcapsules. On a first substrate 1a, a plurality of microcapsules 1i each containing the electrophoretic dispersion liquid are disposed and covered with a second substrate 1b. In the case of using the microcapsules 1i, the insulating layer 1h may be omitted.

In FIGS. 1(a) and 1(b), the first electrode 1c comprises a plurality of electrode portions as pixel electrodes capable of independently applying a desired electric field to the electrophoretic dispersion liquid in each cell (or each microcapsule), and the second electrode 1d is a common electrode through which the same potential is applied to the entire display area.

The first electrode 1c (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 1e) in each of the cells groups.

The electrophoretic particles 1e in each individual cell (or microcapsule) are controlled by an electric field applied through the first electrode 1c, whereby at each pixel, the color (e.g., white) of the electrophoretic particles 1e and the color (e.g., blue) of the dispersion medium 1f are selectively displayed. By effecting such a drive on a pixel-by-pixel basis, it is possible to effect display of arbitrary images and characters by use of corresponding pixels.

The first substrate 1a is formed of any insulating member, for supplying the electrophoretic display device, such a glass, plastic, or the like.

As the first electrode 1c, it is possible to use a (vapor-)deposition film of ITO (indium tin oxide), tin oxide, indium oxide, gold, chromium, or the like. Pattern formation of the first electrode 1c can be performed by photolithography.

The second substrate 1b may be a transparent substrate or a transparent plastic substrate.

As the second electrode 1d, it is possible to use a transparent electrode of a film of ITO or an organic conductive material.

The insulating layer 1h can be formed of a colorless transparent insulating resin, such as acrylic resin, epoxy resin, fluorine-based resin, silicone resin, polyimide resin, polystyrene resin, or polyalkene resin.

The partition wall 1g can be formed of a polymeric material through any method including, e.g., a method wherein the partition wall is formed with a photosensitive resin through the photolithographic process, a method wherein the partition wall which has been prepared in advance is bonded to the substrate, a method wherein the partition wall is formed through molding, or the like.

The method of filling the electrophoretic dispersion liquid is not particularly limited but can be an ink jet method using nozzles.

(Microcapsule)

The microcapsule 1i containing therein the electrophoretic dispersion liquid described above can be prepared through a known method, such as interfacial polymerization, in situ polymerization, coacervation, or the like.

As a material for the microcapsule 1i, a high light-transmissive material may preferably be used. Examples thereof may include: urea-formaldehyde resin, melamine-formaldehyde resin, polyester, polyurethane, polyamide, polyethylene, polystyrene, polyvinyl alcohol, gelatine, their copolymers, and so on.

The method of forming the microcapsules 1i on the first substrate 1a is not particularly restricted but may be an ink jet method using nozzles.

Incidentally, in order to prevent positional deviation of the microcapsule 1i disposed on the substrate, a light-transmissive resin binder may be filled in a gap between adjacent microcapsules to fix the microcapsules on the substrate. As the resin binder, it is possible to use polyvinyl alcohol, polyurethane, polyester, acrylic resin, silicone resin, etc.

In the case of sealing a spacing between the first and second substrates 1a and 1b, the spacing may preferably be sealed under pressure so that the microcapsule 1i has such a shape that a horizontal length is longer than a vertical length with respect to the first substrate 1a (FIG. 1(b)).

(Electrophoretic Dispersion Medium)

As the electrophoretic dispersion medium, it is possible to use a liquid, which is high insulative and colorless and transparent, including: aliphatic hydrocarbons, such as hexane, cyclohexane, kerosine, normal paraffin, isoparaffin, etc. These may be used singly or in mixture of two or more species.

The electrophoretic dispersion medium may be colored with oil soluble dye having a color of R (red), G (green), B (blue), C (cyan), M (magenta), Y (yellow), etc. Examples of the dye may preferably include azo dyes, anthraquinone dyes, quinoline dyes, nitro dyes, nitroso dyes, penoline dyes, phthalocyanine dyes, metal complex salt dyes, naphthol dyes, benzoquinone s dyes, cyanine dyes, indigo dyes, quinoimine dyes, etc. These may be used in combination.

Examples of the oil soluble dye may include Vali Fast Yellow (1101, 1105, 3108, 4120), Oil Yellow (105, 107, 129, 3G, GGS), Vali Fast Red (1306, 1355, 2303, 3304, 3306, 3320), Oil Pink 312, Oil Scarlet 308, Oil Violet 730, Vali Fast Blue (1501, 1603, 1605, 1607, 2606, 2610, 3405). Oil Blue (2N, BOS, 613), Macrolex Blue RR, Sumiplast Green G, Oil Green (502, BG), etc. A concentration of these dyes may preferably be 0.1-3.5 wt. %, per the electrophoretic dispersion medium 1f.

(Dispersion Liquid)

The dispersion liquid at least contain the electrophoretic particles 1e and the electrophoretic dispersion medium 1f. In order to electrically charge the electrophoretic particles 1e, it is preferable that the above described acidic additive or basic additive is added in the dispersion liquid.

(Electrophoretic Display)

Figure 2:
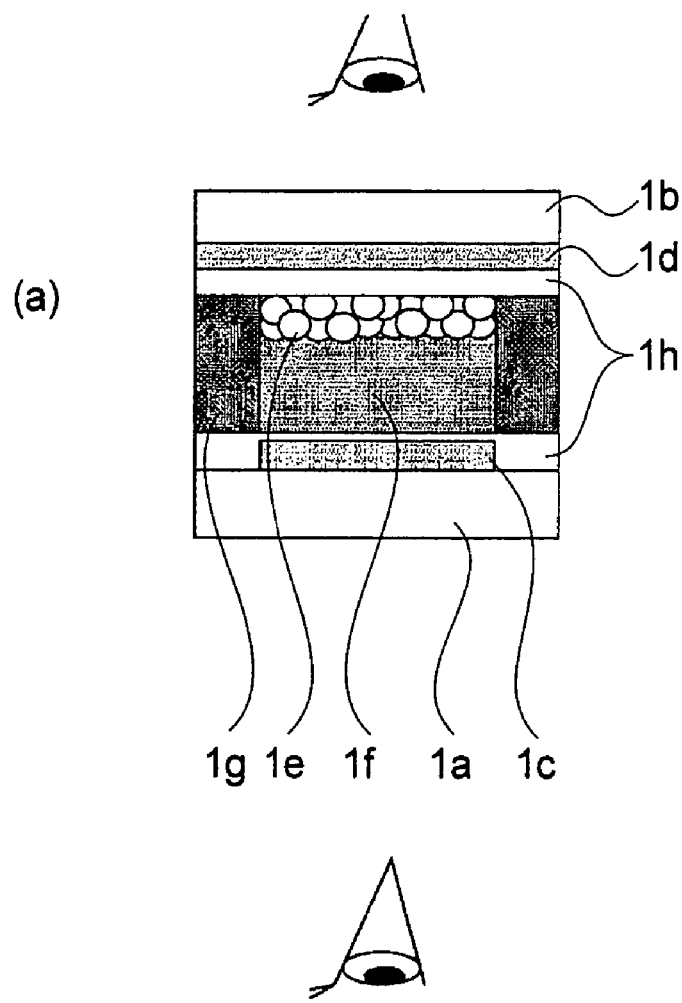
FIGS. 2(a) and 2(b) are schematic views showing a display example of the electrophoretic display device.

A display example of the electrophoretic display device using the electrophoretic particles liquid according to the present invention is shown in FIGS. 2(a) and 2(b).

FIGS. 2(a) and 2(b) illustrate a display example wherein, e.g., an electrophoretic dispersion liquid comprising white electrophoretic particles 1e and a blue electrophoretic dispersion medium 1f is filled in a cell. The electrophoretic particles 1e is negatively charged in this case.

When the electrophoretic particles 1e are collected on the surface of the second electrode 1d as shown in FIG. 2(a) by applying a negative-polarity voltage to the first electrode 1c while keeping the voltage of the second electrode 1d at 0 V, the cell looks white, attributable to the distribution of the white electrophoretic particles 1e, when viewed from above. On the other hand, when the electrophoretic particles 1e are collected on the surface of the first electrode 1c as shown in FIG. 2(b), by applying a positive-polarity voltage to the first electrode while keeping the voltage of the second electrode 1d at 0 V, the cell looks blue when viewed from above.

Figure 3:
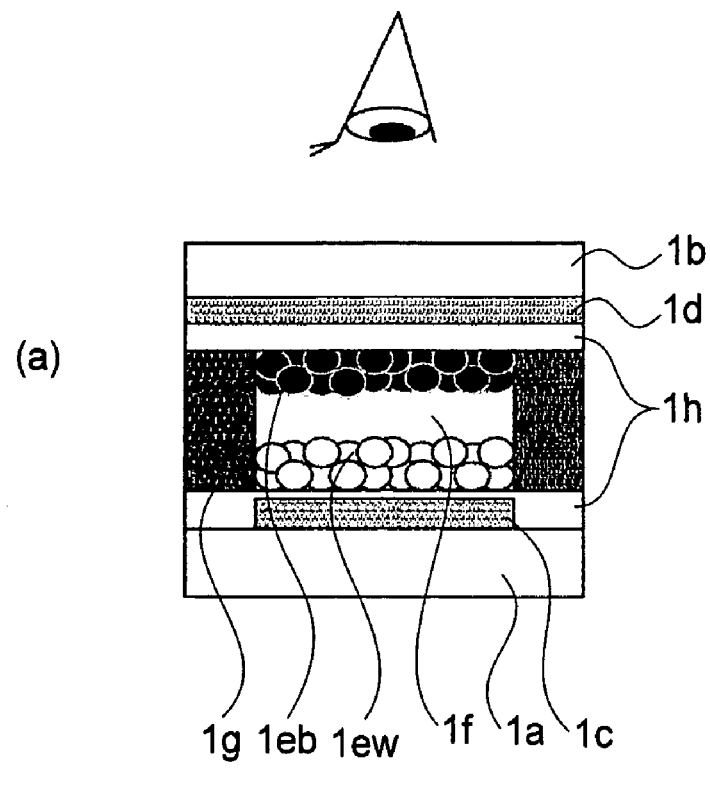
FIGS. 3(a) and 3(b) are schematic views showing another display example of the electrophoretic display device.
Figure 3:
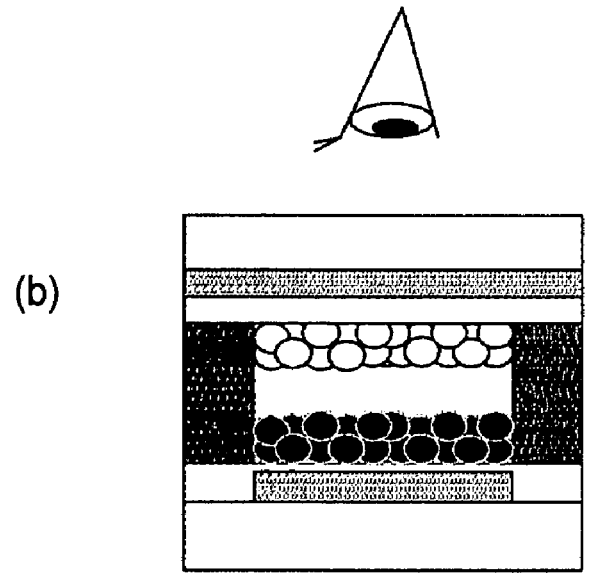

Another display example of the electrophoretic display device using the electrophoretic particles liquid according to the present invention is shown in FIGS. 3(a) and 3(b).

FIGS. 3(a) and 3(b) illustrate a display example wherein, e.g., an electrophoretic dispersion liquid comprising positively charged white electrophoretic particles 1ew, negatively charged black electrophoretic particles 1eb, and a colorless and transparent electrophoretic dispersion medium 1f is filled in a cell.

When the black electrophoretic particles 1eb are collected on the surface of the second electrode 1d and the white electrophoretic particles 1ew are collected on the surface of the first electrode 1c, as shown in FIG. 3(a) by applying a negative-polarity voltage to the first electrode 1c while keeping the voltage of the second electrode 1d at 0 V, the cell looks black, attributable to the distribution of the black electrophoretic particles 1eb, when viewed from above. On the other hand, when the white electrophoretic particles 1ew are collected on the surface of the first electrode 1d and the black electrophoretic particles 1eb are collected on the surface of the first electrode 1c, as shown in FIG. 3(b), by applying a positive-polarity voltage to the first electrode while keeping the voltage of the second electrode 1d at 0 V, the cell looks white, attributable to the distribution of the white electrophoretic particles 1ew, when viewed from above.

The applied voltage varies depending on a charge amount of the electrophoretic particles and a distance between the electrodes but is required to be several volts to several ten volts, and the gradation display can be controlled by the applied voltage and an application time.

By performing such a drive on a pixel-by-pixel basis, it is possible to display an arbitrary image or character by use of a multiplicity of pixels. (Constitution of another electrophoretic display device)

Hereinbelow, another embodiment of an electrophoretic display device using electrophoretic particles of the present invention will be described with reference to the drawings.

FIGS. 1(a) and 1(b) are schematic sectional views each showing another embodiment of the electrophoretic display device using the electrophotographic particles of the present invention.

As shown in FIG. 4(a), the electrophoretic display device includes a first substrate 4a on which a first electrode 4c and a second electrode 4d are disposed. Between the electrodes 4c and 4*d* and on the second electrode 4*d*, an insulating layer 4*h* and an insulating layer 4*i* are formed, respectively. The insulating layer 4*h* formed between the electrodes 4*c* and 4*d* may be colored or may be colorless and transparent, but the insulating layer 4*i* is colorless and transparent.

The electrophoretic display device further includes a second substrate 4*b* disposed opposite to the first substrate 4*a* with a predetermined spacing through a partition wall 4*g*. In a cell (space) defined by the pair of first and second substrates 4*a* and 4*b* and the partition wall 4*g*, an electrophoretic dispersion liquid comprising at least electrophoretic particles 4*e* and an electrophoretic dispersion medium 4*f* is sealed. A display surface of the electrophoretic display device is located on the second substrate 4*b* side.

Figure 4:
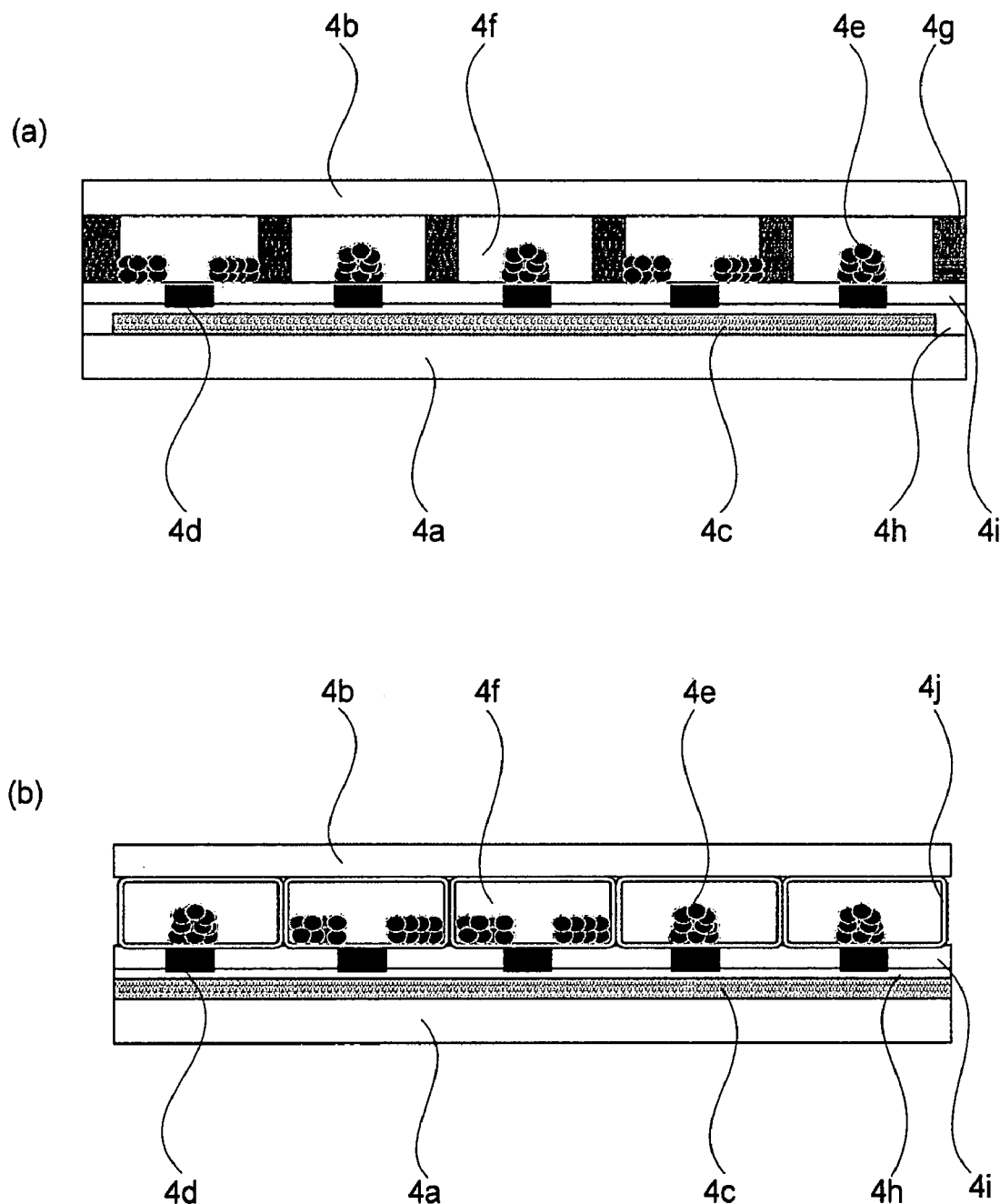
FIGS. 4(a) and 4(b) are schematic sectional views showing another embodiment of an electrophoretic display device using electrophoretic particles of the present invention.

FIG. 4(*b*) shows an electrophoretic display device using microcapsules. On a first substrate 4*a*, a plurality of microcapsules 4*i* each containing the electrophoretic dispersion liquid are disposed and covered with a second substrate 4*b*. In the case of using the microcapsules 4*i*, the insulating layer 4*i* may be omitted.

In FIGS. 4(*a*) and 4(*b*), the second electrode 4*d* comprises a plurality of electrode portions as pixel electrodes capable of independently applying a desired electric field to the electrophoretic dispersion liquid in each cell (or each microcapsule), and the first electrode 4*c* is a common electrode through which the same potential is applied to the entire display area.

The second electrode 4*d* (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 4*e*) in each of the cells groups.

The electrophoretic particles 4*e* in each individual cell (or microcapsule) are controlled by an electric field applied through the second electrode 4*d*, whereby at each pixel, the color (e.g., black) of the electrophoretic particles 4*e* and the color (e.g., white) of the insulating layer 4*h* are selectively displayed. By effecting such a drive on a pixel-by-pixel basis, it is possible to effect display of arbitrary images and characters by use of corresponding pixels.

The first substrate 4*a* is formed of any insulating member, for supplying the electrophoretic display device, such a glass, plastic, or the like.

The second substrate 4*b* may be a transparent substrate or a transparent plastic substrate.

The first electrode 4*c* is a metal electrode of, e.g., Al exhibiting light reflection performance.

The insulating layer 4*h* formed on the first electrode 4*c* is formed of a mixture of a transparent colorless insulating resin with light scattering fine particles of, e.g., aluminum oxide or titanium oxide. As a material for the transparent colorless insulating resin, it is possible use the above described insulating resins. Alternatively, it is also possible to use a light scattering method utilizing unevenness at the surface of the metal electrode without using the fine particles.

The second electrode 4*d* is formed of an electroconductive material, which looks dark black from the viewer side of the electrophoretic display device, such as titanium carbide, black-treated Cr, and Al or Ti provided with a black surface layer. Pattern formation of the second electrode 5 may be performed through a photolithographic process.

On the second electrode 4*d*, the insulating layer 4*i* is formed of, e.g., the transparent colorless insulating resin described above.

In this embodiment, a display contrast is largely depend on an areal ratio between the second electrode 4*d* (each electrode portion) and an associated pixel, so that an exposed area of the second electrode 4*d* is required to be smaller than that of the pixel in order to enhance a contrast. For this reason, it is preferable that the areal ratio therebetween may ordinarily be 1:2 to 1:5.

The partition wall 4*g* may be formed in the same manner as described above. The method of filling the above described electrophoretic dispersion liquid in the cell is not limited particularly but may be the above described ink jet method using nozzles.

(Microcapsule)

The microcapsule 4*j* containing the electrophoretic dispersion liquid can be prepared by the known method as described above, such as interfacial polymerization, in situ polymerization, coacervation, and so on. The material for forming the microcapsule 3*j* may be the same polymer as described above.

The method of forming the microcapsules 4*j* on the first substrate 4*a* is not particularly restricted but may be the above described ink jet method using nozzles.

Incidentally, in order to prevent positional deviation of the microcapsule 4*i* disposed on the substrate, a light-transmissive resin binder may be filled in a gap between adjacent microcapsules to fix the microcapsules on the substrate. As the resin binder, it is possible to use the above described resin.

In the case of sealing a spacing between the first and second substrates 4*a* and 4*b*, the spacing may preferably be sealed under pressure so that the microcapsule 4*i* has such a shape that a horizontal length is longer than a vertical length with respect to the first substrate 1*a* (FIG. 4(*b*)).

(Electrophoretic Dispersion Medium)

As the electrophoretic dispersion medium 4*f*, it is possible to use the above described liquids.

(Electrophoretic Particles)

As the electrophoretic particles 4*e*, it is possible to use black particles (obtained by the same method as that described above). In this embodiment, a concentration of the electrophotographic particles 4*e* may preferably 0.5-10 wt. %, more preferably 1-5 wt. %, per the weight of the electrophoretic dispersion medium 4*f* although it varies depending on the particle size of the electrophoretic particles 4*f*. When the concentration of the electrophotographic particles 4*e* is less than 0.5 wt. %, the first electrode 4*c* cannot be covered completely, so that a display contrast is undesirably lowered. Further, when the concentration of the electrophotographic particles 4*e* exceeds 10 wt. %, the electrophotographic particles extend off the colored second electrode 4*d*, thus undesirably lowering the display contrast.

(Electrophoretic Display)

Figure 5:
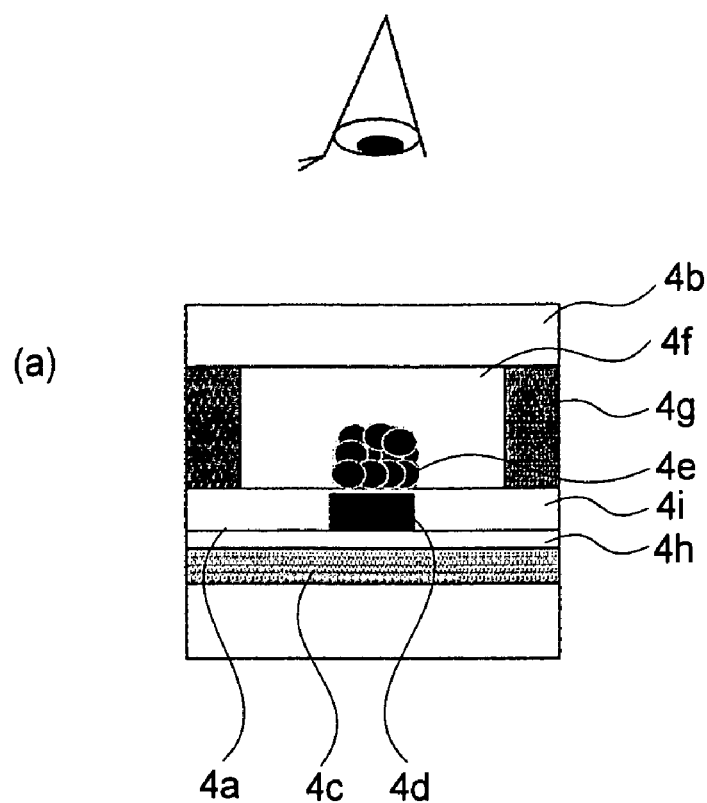
FIGS. 5(a) and 5(b) are schematic views showing a display example of the electrophoretic display device of the another embodiment.
Figure 5:
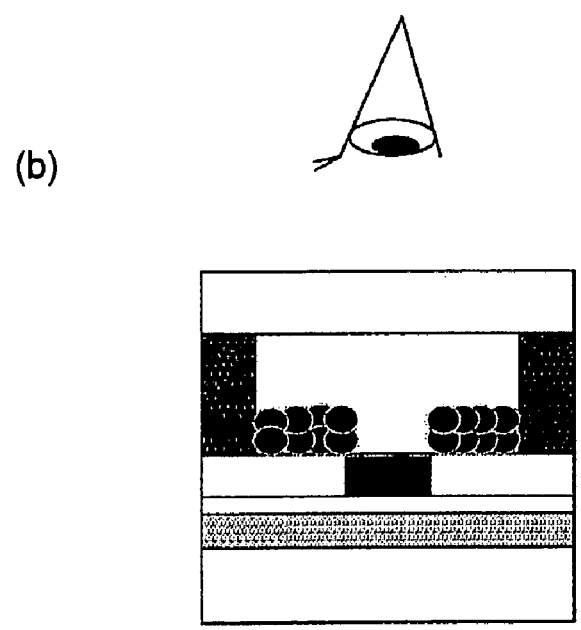

A display example of the electrophoretic display device using the electrophoretic particles liquid according to this embodiment is shown in FIGS. 5(*a*) and 5(*b*).

FIGS. 5(*a*) and 5(*b*) illustrate a display example wherein, e.g., an electrophoretic dispersion liquid comprising black electrophoretic particles 3*e* and a colorless and transparent electrophoretic dispersion medium 4*f* is filled in a cell. The electrophoretic particles 4*e* is negatively charged in this case.

In the case where the color of the surface of the insulating layer 4*h* is white and the color of the surface of the second electrode 4*d* is black, when the electrophoretic particles 4*e* are collected on the surface of the second electrode 4*d* as shown in FIG. 5(*a*) by applying a positive-polarity voltage to the second electrode while keeping the voltage of the first electrode 4c at 0 V, the cell looks white when viewed from above. On the other hand, when the electrophoretic particles 4e are collected on the surface of the first electrode 4c as shown in FIG. 5(b), by applying a negative-polarity voltage to the second electrode while keeping the voltage of the first electrode 4c at 0 V, the cell looks black when viewed from above. The applied voltage varies depending on a charge amount of the electrophoretic particles and a distance between the electrodes but is required to be several volts to several ten volts, and the gradation display can be controlled by the applied voltage and an application time.

By performing such a drive on a pixel-by-pixel basis, it is possible to display an arbitrary image or character by use of a multiplicity of pixels.

(2) Embodiments According to Second Invention

In this invention, electrophoretic particles are obtained by forming composite fine particles each having a functional group at its surface and comprising a polymer and a colorant, introducing a living radical polymerization initiation group to the functional group at the composite fine particle surface, and grafting a polymer chain from the living radical polymerization initiation group through living radical polymerization.

In a step of forming the composite fine particles, dispersion polymerization is used.

Herein, the dispersion polymerization is such a polymerization method wherein the colorant is dissolved or dispersed in a reaction solvent in which a polymerizable monomer and a polymerization initiator are dissolved to effect polymerization, thereby to precipitate insoluble polymer particles. In the reaction solvent, the polymerizable monomer as a principal constitutional material of composite fine particle (hereinafter, the polymerizable monomer is referred to as a "polymerizable monomer for core" since the composite fine particle functions as a core of electrophoretic particle) and, in addition thereto, a polymerizable monomer having a functional group capable of reacting with a precursor of the living radical polymerization initiation group are dissolved and contained. The composite fine particles obtained through this polymerization reaction are not dissolved in the reaction solvent, thus being precipitated as fine particles.

In another embodiment of this invention, electrophoretic particles are obtained by directly forming composite fine particles each having a functional group at its surface and comprising a polymer and a colorant and grafting a polymer chain from a living radical polymerization initiation group located at the composite fine particle surface. Also in this case, the composite fine particles are formed through dispersion polymerization. In a reaction solvent, in addition to the polymerizable monomer for core, a polymerizable monomer having a living radical polymerization initiation group as a constitutional element is also dissolved.

In Second invention the composite fine particles comprising the colorant and the polymerization are formed by the dispersion polymerization, so that the colorant is uniformly contained. As a result, an unevenness in concentration of the particles is less, so that it is possible to obtain fine particles having a uniform particle size. To the resultant fine particles, a polymer chain is provided by the living radical polymerization, so that it is possible to produce electrophoretic particles which are uniform in shape, size, and characteristic.

Hereinbelow, a process for producing electrophoretic particles according to Second invention will be described more specifically.

(Formation of Core Particles)

A core of each of the electrophoretic particles obtained by the production process in this invention is a composite fine particle which comprises the colorant and the polymer and has a substantially spherical structure. In the case, the colorant may be completely contained in the polymer particle or partially exposed at the surface of polymer particle.

After a core composition comprising the colorant, the polymerizable monomer for core, the polymerizable monomer having a functional group capable of reacting with the living radical polymerization initiation group precursor, and a polymerization initiator is dissolved or dispersed in the reaction solvent, the system is subjected to the dispersion polymerization to obtain composite fine particles (core of electrophoretic particles) comprising the colorant and the polymer (hereinafter referred to as a "Process A").

In another production process of this invention, in a production step of forming the core particles, a core composition comprising the colorant, the polymerizable monomer for core, the polymerizable monomer having the living radical polymerization initiation group, and a polymerization initiator is dissolved or dispersed in the reaction solvent and then the system is subjected to the dispersion polymerization to obtain composite fine particles (core of electrophoretic particles) each having the living radical polymerization initiation group localized at the particle surface and comprising the colorant and the polymer (hereinafter referred to as a "Process B").

As described in JP-A Tokuhyo Hei 9-508216 mentioned above, the dispersion polymerization is suitable for production of polymer particles having a particle size which is between those of polymer particles obtained through suspension polymerization and emulsion polymerization, thus being also suitable for production of optimum particles, having a particle size of 1-10 μm, as the core particles for the electrophoretic particles.

The dispersion polymerization used in the production process of this invention is a polymerization method wherein in either of Process A and Process B, polymerization is performed in such a system that the polymerizable monomers are dissolved but the resultant polymer is insoluble and precipitated, so that it is possible to obtain composite fine particles having a narrow particle size distribution. The thus obtained core particles for the electrophoretic particles have an average particle size of 1-10 μm and a value of coefficient of variation (CV value), of particle size distribution, of not more than 15%, preferably not more than 10%. The particle size distribution CV value is represented by the following equation:

$CV (\%) = \{\text{standard deviation of particle } (\mu m)/\text{average particle size } (\mu m)\} \times 100$ A smaller CV value means a narrower particle size distribution.

In the case of effecting high-resolution display, the electrophoretic particles are required to have uniformity in particle size. When the CV value exceeds 15%, the high-resolution display cannot be effected undesirably.

As the reaction solvent, it is possible to use: alcohol, such as, methanol, ethanol, propanol, isopropanol, butanol, pentanol, ethylene glycol, diethylene glycol, and benzyl alcohol; cellosolves, such as methyl cellosolve, ethyl cellosolve, isopropyl cellosolve, and butyl cellosolve; ketones, such as acetone, methyl ethyl ketone, and methyl butyl ketone; esters, such as ethyl acetate, butyl acetate, ethyl propionate, and cellosolve acetates; hydrocarbons, such as hexane, keptane, octane, cyclohexane, benzene, toluene, and xylene; ethers, such as dimethyl ether, diethyl ether, trioxane, and tetrahydrofuran; dimethyl sulfoxide; dimethylformamide; acetonitrile; and water. These may be used singly or in combination of two or more species.

In the dispersion polymerization, it is also possible to add a dispersion stabilizer as desired. Examples thereof may include: polyvinyl alcohol, methyl cellulose, ethyl cellulose, hydroxyethyl cellulose, hydroxypropyl cellulose, poly(meth-)acrylic acid, poly(meth-)acrylates, poly(meth-)acrylamide, polyethyleneoxide, polyvinylpyrrolidone, polyvinylalkylethers, polyvinylacetals, polyacrylonitrile, polyvinylimidazole, polystyrene, polyparahydroxystyrene, polystyrenesulfonate, etc. These may be used singly or in combination of two or more species.

The dispersion stabilizer may preferably used at a concentration of 0.1-30 wt. % per the reaction solvent. The resultant composite fine particles have a relatively large particle size when the dispersion stabilizer concentration is small and are smaller in particle size when the dispersion stabilizer concentration is large. For this reason, the concentration of the dispersion stabilizer may appropriately be determined depending on an objective particle size.

The dispersion polymerization is effected in an atmosphere of inert gas, such as nitrogen (gas), argon (gas), and the like. A polymerization temperature varies depending on the kind of polymerization initiator used but may preferably be in the range of about 50-90° C. A polymerization time may preferably be 0.5-30 hours, more preferably 2-10 hours.

(Colorant)

As the colorant, it is possible to use a pigment or a dye singly or in combination. When the pigment and the dye are used in combination, a mixing ratio may be determined appropriately depending on a system used.

As the pigment, it is possible to use an organic pigment, an inorganic pigment, etc.

Examples of organic pigment may include those described in the embodiments of First invention.

Examples of the inorganic pigment may include: those, such as titanium oxide, described in the embodiments of First invention.

The pigment may preferably have an average particle size of 10-500 nm, more preferably 20-200 nm. Below 10 nm, a handling characteristic is undesirably lowered considerably. Above 500 nm, a degree of pigmentation of the pigment is desirably lowered and the resultant particles are unsuitable for electrophoretic particles of a smaller size.

The pigment may preferably be added in an amount of 0.1-30 wt. %, more preferably 1-15 wt. %, with respect to the polymerizable monomer for the core.

As the dye used as the colorant, it is possible to use, e.g., those of equalysine-type, azine-type, azo-type, azomethine-type, anthraquinone-type, indigo-type, xanthene-type, dioxazine-type, diphenylmethane-type, thiazine-type, thiazole-type, thioindigo-type, triphenylmethane-type, polymethine-type, and the like. These dyes may be used singly or in combination of two or more species.

The dye may preferably added in an amount of 0.1-30 wt. %, more preferably 1-20 wt. % with respect to the polymerizable monomer for the core.

(Polymerizable Monomer for Core)

As the for the polymerizable monomer for the core, it is possible to use various vinyl monomers.

20. Examples thereof may include those described in the embodiments of First invention. These monomers may be used singly or in combination of two or more species.

Further, it is also possible to use a cross linking agent, as desired, in combination with the 25 polymerizable monomer for the core. Examples thereof may include: those, such as divinylbenzene, described in the embodiments of First invention. These compounds may be used singly or in combination of two or more species.

(Polymerizable Monomer Having Functional Group Capable of Reacting with Living Radical Polymerization Initiation Group Precursor)

In the case of the above described Process A, for the dispersion polymerization, the polymerizable monomer having the functional group capable of reacting with the precursor of living radical polymerization initiation group is dissolved or dispersed in the reaction solvent together with the colorant and the polymerizable monomer for core.

In the case where a subsequent step of forming a polymer chain by the living radical polymerization, as the polymerizable monomer having the above described functional group, it is possible to use, e.g., ethylene glycol (meth-)acrylate represented by the following formula (2-I):

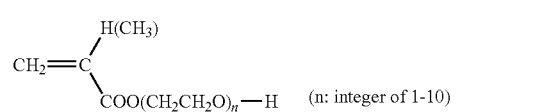

Formula (2-I)

In the case where the subsequent step of forming a polymer chain by the living radical polymerization is performed by the nitroxide-mediated polymerization, as the polymerizable monomer having the functional group capable of reacting with the living radical polymerization initiation group precursor, it is possible to use, e.g., 4-ethylstyrene. In this case, the polymerizable monomer for core may also preferably be 4-ethylstyrene.

(Polymerizable Monomer Having Living Radical Polymerization Initiation Group)

In the case of the above described Process B, for the dispersion polymerization, the polymerizable monomer having the living radical polymerization initiation group is dissolved or dispersed in the reaction solvent together with the colorant and the polymerizable monomer for core.

In the case where the living radical polymerization initiation group is the atom transfer radical polymerization initiation group, as the polymerizable monomer having the atom transfer radical polymerization initiation group, it is possible to use, e.g., polymerizable monomers represented by the following formulas (2-II) and (2-III):

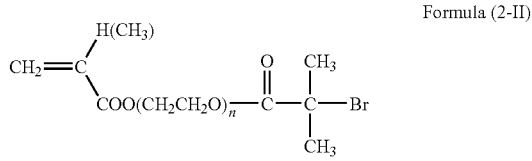

Formula (2-II)

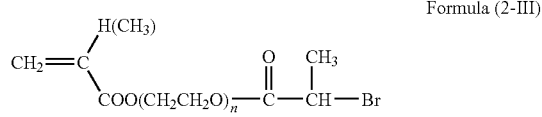

Formula (2-III)

When the dispersion polymerization is performed by using the polymerizable monomer represented by the formula (2-II) or (2-III), it is possible to synthesize the core particles each having the atom transfer radical polymerization initiation group at its surface in one step, so that it is possible to omit an induction step of the living radical polymerization initiation group described later.

(Polymerization Initiator)

As the polymerization initiator, it is possible to use an oil-soluble azo-type or peroxide-type initiator generally used in suspension polymerization. Examples thereof may include those, such as described in the embodiments of First invention.

The polymerization initiator may preferably be used in an amount of 0.1-10 wt. % with respect to the polymerizable monomers including the polymerizable monomer for the core and the functional group-containing polymerizable monomer.

(Introduction of Living Radical Polymerization Initiation Group)

In the case of forming the core particles by Process A, it is necessary to convert the functional group capable of reacting with the living radical polymerization initiation group precursor located at the core particle surface into the living radical polymerization initiation group. This conversion is performed by connecting a compound having the living radical polymerization initiation group with the functional group located at the core particle surface.

In the case where a subsequent step of forming a polymer chain by the living radical polymerization is performed by the atom transfer radical polymerization, it is possible to introduce the atom transfer radical polymerization initiation group through reaction formulas (2-I) to (2-IV) shown below.

As described above, as the polymerizable monomer having the functional group capable of reacting with the precursor of atom transfer living radical polymerization initiation group, it is possible to use ethylene glycol (meth-)acrylate of the formula (2-I). In this case, composite fine particles each having hydroxyl group localized at the particle surface and comprising the colorant and the polymer. After the composite fine particles are dispersed in the reaction medium, an acid anhydride shown in the reaction formula (2-I) or (2-II) as the precursor of atom transfer radical polymerization initiation group is added in the reaction solvent to effect esterification to provide the atom transfer polymerization initiation group at the surface of each core particle.

Alternatively, the esterification is effected by dispersing the composite fine particles having hydroxyl group at their surfaces and adding an acid bromide shown in the reaction formula (2-III) or (2-IV) as the precursor of atom transfer radical polymerization initiation group to provide the atom transfer polymerization initiation group at the surface of each core particle.

The reaction solvent is not particularly limited so long as the core particles are dispersed and are not dissolved in the reaction solvent. Examples thereof may include dimethyl sulfoxide, dimethylformamide, tetrahydrofuran, acetonitrile, etc.

Reaction Formula (2-I)

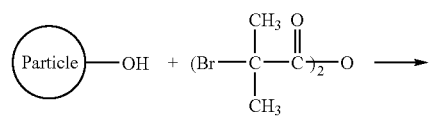

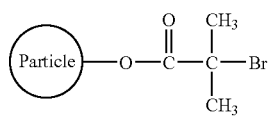

Reaction Formula (2-II)

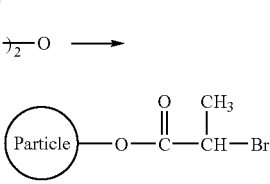

Reaction Formula (2-III)

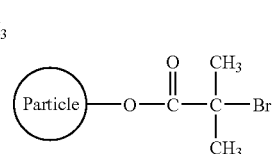

Reaction Formula (2-IV)

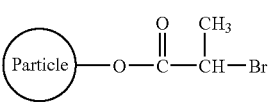

In the case where the subsequent step of forming a polymer chain by the living radical polymerization is performed by the nitroxide-mediated polymerization, it is possible to introduce a nitroxide-mediated polymerization initiation group through a reaction formula (2-V) shown below.

Reaction Formula (2-V)

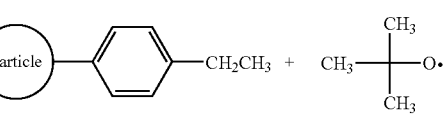

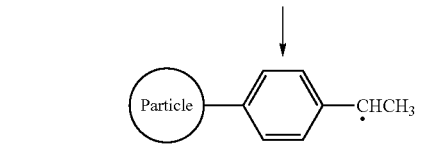

Nitroxide 1

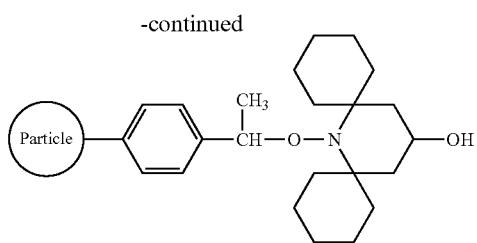

As described above, when the dispersion polymerization is performed by dissolving 4-ethylstyrene in the reaction solvent, composite fine particles in the reaction solvent, composite fine particles each having ethyl group at its surface as shown by a starting material in the reaction formula (2-V). After the particles are dispersed in the reaction solvent, when tert-butoxy radical is added in the system, hydrogen of the ethyl group is drawn by the tert-butoxy radical as shown in a first reaction stage shown in the reaction formula (2-V). Thereafter, when Nitroxide 1 is added in the system, a second stage reaction of the reaction formula (2-V) is caused to occur the remaining radical of the ethyl group reacts with Nitroxide 1 to introduce a nitroxide-mediated polymerization initiation group to the particle surface.

The reaction solvent is not particularly limited so long as the core particles are dispersed and are not dissolved in the reaction solvent. Examples thereof may include dimethyl sulfoxide, dimethylformamide, benzene, toluene, xylene, etc.

In the reaction formula (2-V), it is also possible to use the following Nitroxides 2 to 9 in stead of Nitroxide 1.

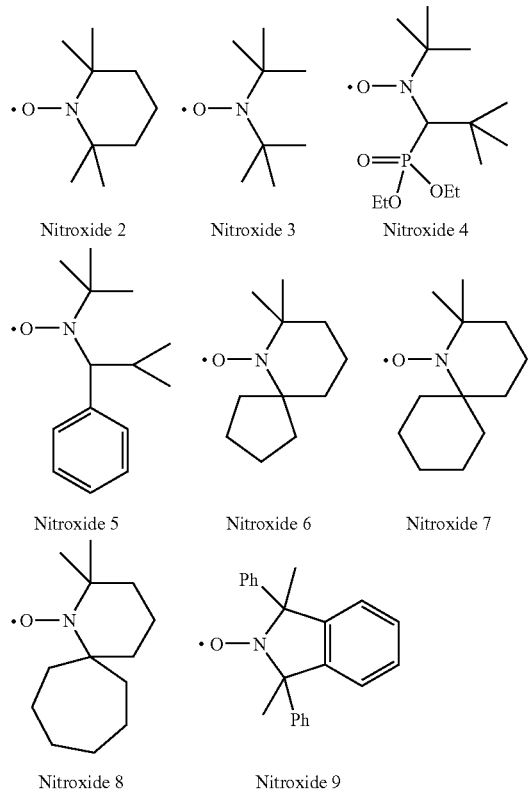

(Living Radical Polymerization)

As described above, the core particles each having the living radical polymerization initiation group at its surface are prepared.

Then, the living radical polymerization is performed to form a polymer chain at the core particle surface.

(Atom Transfer Radical Polymerization)

The case where the living radical polymerization is the atom transfer radical polymerization will be described. The atom transfer radical polymerization is preferred since it can produce a polymer having a small molecular weight distribution index (weight-average molecular weight/number-average molecular weight) and permits easy polymerization of various polymerizable monomers.

By using, as the core particles, the particles to which the atom transfer radical polymerization initiation group is introduced through the reaction formulas (2-I) to (2-IV), it is possible to easily form polymer chains having a uniform chain length at the surfaces of core particles.

After the core particles are dispersed in the reaction solvent, a polymerizable monomer for constituting the polymer chain and a transfer metal complex are added and then an atmosphere of the reaction system is replaced with inert gas to effect the atom transfer radical polymerization.

The reaction solvent is not particularly limited so long as the core particles are dispersed and are not dissolved in the reaction solvent. Examples of the reaction solvent may include those, such as dimethyl sulfoxide, described in the embodiments of First invention. These may be used singly or in combination of two or more species.

As the inert gas, it is possible to use nitrogen or argon.

The transfer metal complex used comprises halogenated metal and a ligand. As a metal species of the halogenated metal, transfer metal from Ti (atomic member: 22) to Zn (atomic number: 30) are preferred. Of these, Fe, Co, Ni and Cu are further preferred. As the halogenated metal, cuprous chloride and cuprous bromide are particularly preferred.

The ligand is not particularly limited so long as it is capable of coordinating with the halogenated metal. Example thereof may include those, such as 2,2'-bipyridyl, described in the embodiments of First invention.

The metal transfer complex may preferably be added in an amount of 0.001-10 wt. %, more preferably 0.05-5 wt. %, with respect to the polymerizable monomer constituting the polymer chain.

A polymerization temperature is in the range of 40-100° C., preferably 50-80° C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the atom transfer radical polymerization initiation group fixed at the particle surface is selected. More specifically, with respect to the particles obtained through the reaction formula (2-I), 2-bromo ethyl isobutyrate is preferred. With respect to the particles obtained through the reaction formula (2-II), 2-bromo ethyl propionate is preferred.

After the reaction, the formed particles each provided with the grafted polymer chain are washed and recovered by an appropriate method, such as filtration, decantation, centrifugation, or the like, and then are subjected to drying and classification to obtain electrophoretic particles.

(Nitroxide-Mediated Polymerization)

The case where the living radical polymerization is the nitroxide-mediated polymerization will be described. The nitroxide-mediated polymerization is preferred since it can produce a polymer having a small molecular weight distribution index (weight-average molecular weight/number-average molecular weight) and permits easy polymerization of various polymerizable monomers.

By using, as the core particles, the particles to which the atom nitroxide-mediated polymerization initiation group is introduced through the reaction formula (2-V), it is possible to easily form polymer chains having a uniform chain length at the surfaces of core particles.

After the core particles are dispersed in the reaction solvent, a polymerizable monomer for constituting the polymer chain is added and then an atmosphere of the reaction system is replaced with inert gas to effect the atom transfer radical polymerization.

The reaction solvent is not particularly limited so long as the core particles are dispersed and are not dissolved in the reaction solvent. Examples of the reaction solvent may include dimethyl sulfoxide, dimethylformamide, tetrahydrofuran, acetonitrile, benzene, toluene, xylene, etc. Alternatively, the polymerization may be performed without using the reaction solvent.

As the inert gas, it is possible to use nitrogen or argon.

A polymerization temperature is in the range of 40-100° C., preferably 50-90 C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the nitroxide-mediated polymerization initiation group fixed at the particle surface is selected. More specifically, with respect to the particles obtained through the reaction formula (2-V), Nitroxide 1 is preferred.

After the reaction, the formed particles each provided with the grafted polymer chain are washed and purified by separation by an appropriate method, such as filtration, decantation, centrifugation, or the like to obtain electrophoretic particles.

(Polymerizable Monomer Providing Polymer Chain and Polymer Chain)

The electrophoretic particles are required to have an electric charge function and a dispersion function. These functions can be imparted optimally to the formed polymer chain by appropriately selecting a polymerizable monomer used in the living radical polymerization to control growth of the polymer chain.

First, the dispersion function will be described.

The polymer chain having the dispersion function is characterized in that it is a polymer having a high affinity with the electrophoretic dispersion medium. The high affinity means that the polymer chain and the electrophoretic dispersion medium are excellent in mutual solubility without causing phase separation. The polymer chain has a steric-exclusion effect of preventing agglomeration between particles by possessing an expanse in the electrophoretic dispersion medium.

As the polymerizable monomer providing the polymer chain having the dispersion function, as described above, the resultant polymer is required to have the high affinity with the electrophoretic dispersion medium. Examples of the polymerizable monomer may include 1-hexene, 1-heptene, 1-octene, 1-decene, butadiene, isoprene, isobutylene, etc. These may be used singly or in combination of two or more species.

Next, the polymer chain having the charge function will be described.

As the polymerizable monomer providing the polymer chain having the charge function, it is possible to use a basic polymerizable monomer, an acidic polymerizable monomer, and a fluorine-containing polymerizable monomer.

Examples of the basic polymerizable monomer may include those, such as methyl (meth-)acrylate, described in the embodiments of First invention.

When an acidic additive is added to the polymer chain obtained from the basic polymerizable monomer, an acid-base interaction between these substances are caused to occur, thus imparting positive chargeability to the particles. Further, the polymer chain having the charge function can also have the dispersion function by appropriately selecting the kinds of the basic polymerizable monomer and the acidic additive and by appropriately adjusting an addition amount of the acidic additive, so that it is not necessary to effect grafting of the polymerizable monomer having the dispersion substance to the particle.

As the acidic additive, an acidic substance which is soluble in the electrophoretic dispersion medium is preferred. For example, it is possible to use rosin acid, rosin ester, rosin acid derivative, poly(meth-)acrylic acid, polyisobutylenesuccinic acid anhydride, etc.

An addition amount of the acidic additive may appropriately added depending on the kind thereof but may preferably be 0.001-10 wt. %, preferably 0.01-5 wt. %, with respect to the electrophoretic dispersion medium.

On the other hand, examples of the acidic polymerizable monomer may include those, such as (meth-)acrylic acid, described in the embodiments of First invention.

When a basic additive is added to the polymer chain obtained from the acidic polymerizable monomer, an acid-base interaction between these substances are caused to occur, thus imparting negative chargeability to the particles. Further, the polymer chain having the charge function can also have the dispersion function by appropriately selecting the kinds of the acidic polymerizable monomer and the basic additive and by appropriately adjusting an addition amount of the basic additive, so that it is not necessary to effect grafting of the polymerizable monomer having the dispersion substance to the particle.

As the basic additive, a basic substance which is soluble in the electrophoretic dispersion medium is preferred. For example, it is possible to use those, such as polyisobutylsuccinimide as described in the embodiments of First invention.

An addition amount of the basic additive may appropriately added depending on the kind thereof but may preferably be 0.001-10 wt. %, preferably 0.01-5 wt. %, with respect to the electrophoretic dispersion medium.

Further, examples of the fluorine-containing polymerizable monomer may include those, such as (meth-)acrylate as described in the embodiments of First invention.

The polymer chain obtained from the fluorine-containing polymerizable monomer has fluorine (atom) which has a large electronegativity, so that it is possible to impart negative chargeability to the particle. The polymer chain has such an affinity with the electrophoretic dispersion medium that it is not so high, thus being preferably one obtained through block polymerization between the fluorine-containing polymerizable monomer and the polymerizable monomer having the dispersion function.

The grafted polymer chain is characterized in that it has a molecular weight distribution index (weight-average molecular weight/number-average molecular weight) which is controlled to be not more than 1.8, preferably not more than 1.5, further preferably not more than 1.3. When the molecular weight distribution index of the grafted polymer chain exceeds 1.8, it is difficult to say that the chain length of polymer chain is uniform and the electrophoretic particles are undesirably liable to cause unevenness in dispersibility and chargeability.

The number-average molecular weight may appropriately be determined depending on whether the polymer chain is of the dispersion function-type or the charge function-type. In the case where the polymer chain is of the dispersion function-type, the number-average molecular weight may preferably be in the range of 500-1,000,000, more preferably 1,000-500,000. Below 500, it is difficult for the polymer chain to have the dispersion function. Above 1,000,000, the solubility in the electrophoretic dispersion medium is undesirably lowered.

A graft density of the polymer chain can be controlled by a degree of introduction of the atom transfer radical polymerization initiation group or the nitroxide-mediated polymerization initiation group. Further, the chain length of the polymer chain can be controlled by the addition amount of the polymerizable monomer, the polymerization time, etc.

With respect to the electrophoretic particles 1e obtained by grafting of the polymer chain having a uniform chain length at the surface of each of the composite fine particles having a narrow particle size distribution, it is possible to control the particle size distribution CV value in the range of not more than 15% and the average particle size in the range of 1-10 µm.

The electrophotographic particles 1e for use in electrophoretic display may preferably have an average particle size of 1-10 µm, more preferably 1-3 µm. When the average particle size exceeds 10 µm, display at high resolution cannot be performed. When the average particle size is less than 1 µm, there arises such an undesirable problem that the core particles) for (composite fine particles) for the electrophoretic particles 1e of the present invention are not readily produced by dispersion polymerization.

The electrophotographic particles 1e may preferably have a concentration of 0.5-50 wt. %, more preferably 1-30 wt. %, per the weight of the electrophoretic dispersion medium 1f although the concentration varies depending on the particle size of the electrophotographic particles.

(Application of Electrophoretic Particles to Electrophoretic Display Device)

The electrophoretic particles obtained through the production processes thereof described in the embodiments of this (Second) invention are applicable to the electrophoretic display devices described in the embodiments of First invention with reference to FIGS. 1 to 4.

(3) Embodiments According to Third Invention

The process for producing the electrophoretic particles according to this invention comprises the following steps (a) to (g):

(a) a step of forming polymer fine particles each having a functional group, to be converted into a living radical polymerization initiation group in a later step, by a polymerization method such as emulsion polymerization, (b) a step of preparing a polymer fine particle dispersion liquid in which the polymer fine particles are dispersed in a liquid, (c) a step of preparing a colorant dispersion liquid in which a colorant is dispersed in a liquid, (d) a step of mixing the polymer fine particle dispersion liquid and the colorant dispersion liquid to obtain agglomeration particles comprising the polymer fine particles and the colorant which are agglomerated in the dispersion liquid, (e) a step of heat-melting the agglomeration particles to form composite particles comprising the polymer and the colorant, (f) a step of introducing a living radical polymerization initiation group to the functional group located at the composite particle surface, and (g) a step of forming a polymer chain at the composite particle surface by living radical polymerization.

Alternatively, the step (a) may also be replaced with the following step (a'):

(a') a step of preparing polymer fine particles having a living radical polymerization initiation group by a polymerization method such as emulsion polymerization or the like. In this case, the step (f) can be omitted.

The above steps will be sequentially described.

(Formation of Polymer Fine Particles)

A method of forming the polymer fine particles having the functional group or the living radical polymerization initiation group will be explained.

The method of forming the polymer fine particles include the following two methods (i) and (ii):

(i) a method wherein a functional group for reacting with a precursor of the living radical polymerization initiation group in a later step is provided to (each of) the polymer fine particles, and (ii) a method of directly providing the living radical polymerization initiation group to the polymer fine particles.

Method (i)

In the case where living radical polymerization used in the later polymer chain forming step is atom transfer radical polymerization, an atom transfer radical polymerization initiation group is introduced to the particle surface. The polymer fine particles having the functional group can be obtained by emulsion polymerization of ethylene glycol (meth-)acrylate represented by formula (3-I) shown below and a comonomer. The resultant polymer fine particles have a particle size of about 0.1-10 µm, preferably about 0.1-1 µm. Any polymerization method other than the emulsion polymerization may be used so long as the resultant polymer fine particles have the particle size in the above range.

Formula (3-I)

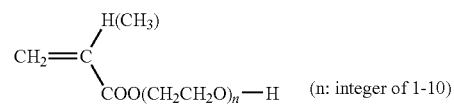

As the comonomer, it is possible to use various vinyl-type monomers, examples of which may include those described in the embodiments of First invention. These may be used singly or in mixture of two or more species.

Further, it is also possible to use a cross linking agent in combination with the polymerizable monomers, as desired. Examples of the cross linking agent may include those, such as divinylbenzene, described in the embodiments of First invention. These may be used singly or in mixture of two or more species.

In the case where living radical polymerization used in the later polymer chain forming step is nitroxide-mediated polymerization, a nitroxide-mediated polymerization initiation group is introduced to the particle surface. The polymer fine particles having the functional group can be obtained by emulsion polymerization of 4-ethylstyrene and a comonomer. In this case, the comonomer may also preferably be 4-ethylstyrene. It is also possible to use the above described cross linking agent in combination therewith, as desired.

Method (ii)

As a method of providing directly the living radical polymerization initiation group at the particle surface of the polymer fine particles, it is possible to use precipitation polymerization of a polymerizable monomer represented by formula (3-II) or (3-III) shown below and a comonomer. The comonomer may preferably be divinylbenzene.

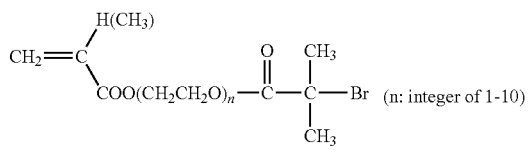

Formula (3-II)

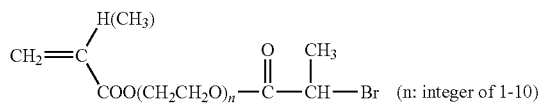

Formula (3-III)

(Formation of Agglomeration Particles)

The agglomeration step is such a step that the agglomeration particles are prepared by mixing a polymer fine particle dispersion in which polymer fine particles having a functional group or a living radical polymerization initiation group at each surface are dispersed and a colorant dispersion liquid in which a colorant is dispersed to cause agglomeration of the polymer fine particles and the colorant.

The polymer fine particle dispersion liquid can be prepared by dispersing the polymer fine particles in a medium (solvent) containing an ionic surfactant.

The colorant dispersion liquid can be prepared by dispersing the colorant in the medium containing an ionic surfactant. In this case, the ionic surfactant may preferably have the same polarity as that used for preparing the polymer fine particle dispersion liquid.

After these dispersion liquids are mixed, another ionic surfactant having a polarity opposite to that of the above described ionic surfactant(s) is added and stirred to the mixture to obtain the agglomeration particles. The stirring may preferably be performed at a temperature f not more than a glass transition temperature of the polymer fine particles. When the mixture is stirred at such a temperature, the polymer fine particles and the colorant cause heteroagglomeration by the action of the ionic surfactants different in polarity in the mixture, thus providing stable agglomeration particles. It is possible to appropriately control a particle size of the agglomeration particles by the kinds and combinations of the respective ionic surfactants and a ratio of addition amounts thereof.

As the medium (solvent), it is possible to use, e.g., water, methanol, ethanol, propanol, isopropanol-, etc. These may be used singly or in combination of two or more species.

(Colorant)

The colorant used in the above described agglomeration step will be described in detail.

The colorant may preferably have an average particle size of 10-500 nm, more preferably 20-200 nm. Below 10 nm, a handling characteristic is undesirably lowered considerably. Above 500 nm, a degree of pigmentation of the pigment is desirably lowered and the resultant particles are unsuitable for electrophoretic particles of a smaller size.

A weight ratio between the colorant and the polymer fine particles may preferably 0.01-1, more preferably 0.02-0.6. Below 0.01, the content of the colorant becomes small, so that the color of the particles becomes poor undesirably. Above 1, the amount of the polymer fine particles as a binder becomes small it is undesirably difficult to obtain spherical particles.

As the colorant, it is possible to use a pigment or a dye singly or in combination. When the pigment and the dye are used in combination, a mixing ratio may be determined appropriately depending on a system used.

As the pigment, it is possible to use an organic pigment, an inorganic pigment, etc.

Examples of organic pigment may include those, such as azo pigments, described in the embodiments of First invention.

Examples of the inorganic pigment may include those, such as titanium oxide, described in the embodiments of First invention.

As the dye, it is possible to use, e.g., those, such as aqualysine-type dye, as described in the embodiments of First invention. These dyes may be used singly or in combination of two or more species.

(Ionic Surfactant)

As the ionic surfactants used in the agglomeration step, it is possible to use a cationic surfactant and an anionic surfactant.

As the cationic surfactant, it is possible to use: laurylamine hydrochloride; stearylamine hydrochloride; laurylamine acetate; stearylamine acetate; alkyltrimethylammonium chloride; dialkyl-dimethylammonium chlorides, such as dilauryldimethyl-ammonium chloride and distearyldimethylammonium chloride; dialkylammonium chlorides, such as dilauryl-ammonium chloride and distearylammonium chloride; lauryldihydroxyethylmethylammonium chloride; oleylbispolyoxyethylenemethylammonium chloride, alkyldimethylbenzylammonium chloride; etc.

As the anionic surfactant, it is possible to use: sodium oleate, potassium laurate, octyl sulfate, lauryl sulfate, nonylphenyl ether sulfate, lauryl ether sulfate, lauryl sulfonate, sodium dodecylbenzenesulfonate, sodium dodecylsulfonate, sodium alkylnaphthalenesulfonate, triisopropyl-naphthalenesulfonate, dibutylnaphthalenesulfonate, lauric acid amide sulfonate, oleic acid amide sulfonate, isopropyl phosphate, lauryl phosphate, nonyl ether phosphate, sodium dioctylsulfosuccinate, etc.

(Formation of Composite Particles)

The agglomeration particles is heated and melted to obtain a composite particles (as core particles for the electrophoretic particles) which are provided with the functional group or the living radical polymerization initiation group localized at each particle surface and comprise the colorant and the polymer The heating temperature may preferably be in a temperature range from a glass transition temperature of the polymer fine particles constituting the agglomeration particles to a decomposition temperature thereof. By appropriately selecting the heating temperature, it is possible to arbitrarily control the shape, of the resultant composite particles, from an determinated shape to spherical shape. When the composite particles are used in the electrophoretic display device, the shape thereof may preferably be spherical.

The heat-melting time varies depending on the heating temperature but may generally be 0.5-12 hours. After the heat-melting step, it is possible to obtain objective composite particles through filtration, washing and drying.

(Introduction of Polymerization Initiation Group)

In the case of the above described Method (i), each of the above prepared composite particles comprising the colorant and the polymer (hereinafter, referred to as "core particles") has a functional group, at it surface or therein, which is derived from:

A. a polymerizable monomer having a functional group capable of reacting with a living radical polymerization initiation group precursor, or B. a polymerizable monomer having a functional group capable of reacting with a nitroxide-mediated polymerization initiation group, and is capable of reacting with:

A'. a living radical polymerization initiation group precursor, or

B'. a nitroxide-mediated polymerization initiation group.

In this case, the functional group of each core particle is required to be reacted with the polymerization initiation group precursor A' or the polymerization initiation group B' to add the polymerization initiation group to the core particle. This step is not necessary when the polymer fine particles are originally provided with the living radical polymerization initiation group. However, by providing the functional group capable of reacting with the precursor of living radical polymerization initiation group to the polymer fine particles and, after causing the polymer fine particles to cause agglomeration and melting, introducing the living radical polymerization initiation group to the polymer fine particles, it is possible to form the living radical polymerization initiation group localized at the particle surface. As a result, the resultant living radical polymerization initiation group is caused to act effectively.

The added polymerization initiation group is different depending on whether a subsequent living radical polymerization is atom transfer radical polymerization or nitroxide-mediated polymerization, so that a corresponding reaction is also different as described below.

In the case where the living radical polymerization is the atom transfer radical polymerization, as described in the above described core particle forming step, core particles are obtained by polymerizing the ethylene glycol (meth-)acrylate represented by the above described formula (3-I) with a comonomer. As a result, at the surface of each of the core particles, hydroxyl group is added. The thus prepared core particle is subjected to any of reaction formulas (3-I) to (3-IV) shown below to provide the atom transfer radical polymerization initiation group at the surface thereof.

More specifically, after the core particles are dispersed in the reaction medium, an acid anhydride shown in the reaction formula (3-I) or (3-II) as the precursor of atom transfer radical polymerization initiation group is added in the reaction solvent to effect esterification to provide the atom transfer polymerization initiation group at the surface of each core particle.

Alternatively, the esterification is effected by adding an acid bromide shown in the reaction formula (3-III) or (3-IV) as the precursor of atom transfer radical polymerization initiation group to provide the atom transfer polymerization initiation group at the surface of each core particle.

The reaction solvent is not particularly limited so long as the core particles are dispersed and are not dissolved in the reaction solvent. Examples thereof may include dimethyl sulfoxide, dimethylformamide, tetrahydrofuran, acetonitrile, etc.

Reaction Formula (3-I)

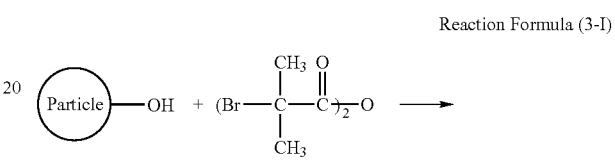

Reaction Formula (3-II)

Reaction Formula (3-III)

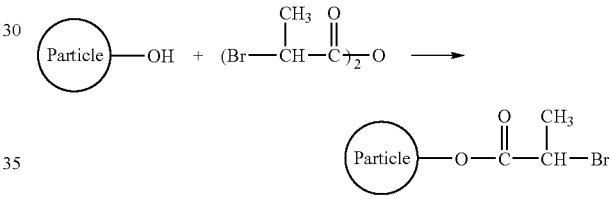

Reaction Formula (3-IV)

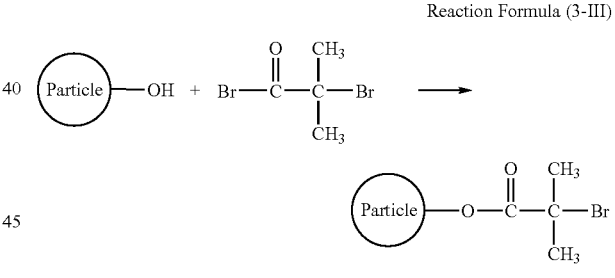

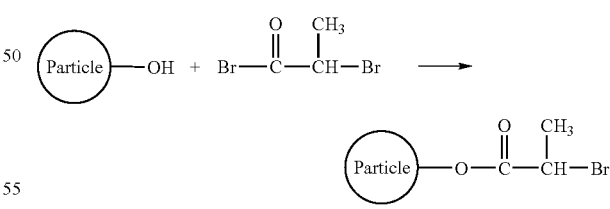

In the case where the living radical polymerization is the nitroxide-mediated polymerization, as described in the above described polymer fine particle forming step, polymer fine particles are obtained by using 4-ethyl styrene as the polymerizable monomer having the functional group and using 4-ethyl styrene as the comonomer. The thus prepared core particle is subjected to a reaction formula (3-V) shown below to provide the nitroxide-mediated polymerization initiation group at the surface thereof.

Reaction Formula (3-V)

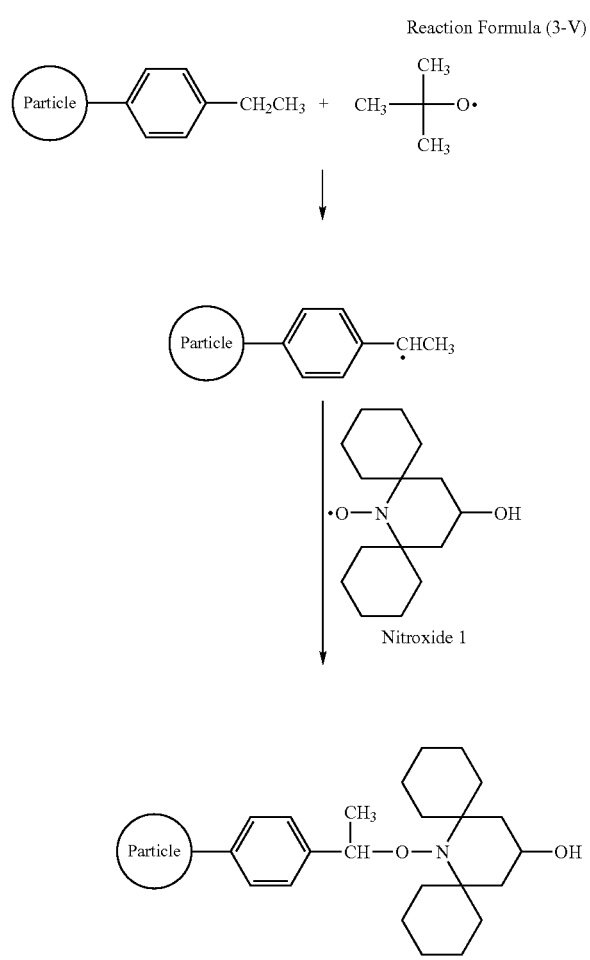

Nitroxide 1

The reaction formula (3-V) shows such a process that at the surface of core particle dispersed in the reaction solvent, hydrogen of ethyl group located at the core particle surface is drawn by tert-butoxy radical and the remaining radical of the ethyl group reacts with nitroxide 1 to form a nitroxide-mediated polymerization initiation group.

The reaction solvent is not particularly limited so long as the core particles are dispersed and are not dissolved in the reaction solvent. Examples thereof may include dimethyl sulfoxide, dimethylformamide, benzene, toluene, xylene, etc.

In the reaction formula (3-V), it is also possible to use the following nitroxides 2 to 9 in stead of the nitroxide 1.

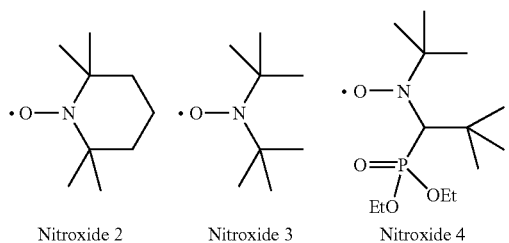

Nitroxide 2  Nitroxide 3  Nitroxide 4

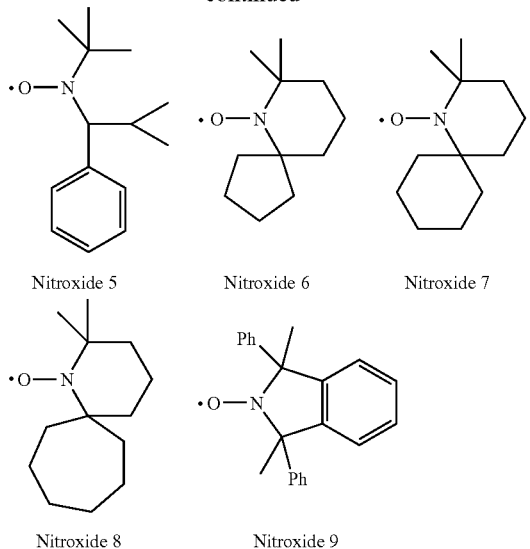

Nitroxide 5  Nitroxide 6  Nitroxide 7

Nitroxide 8  Nitroxide 9

(Formation of Polymer Chain at Core Particle Surface)

As described above, the core particles each having the polymerization initiation group at its surface are prepared.

Then, the living radical polymerization is performed by using the polymerization initiation group at the core particle surface as a reaction start point to form a polymer layer having a uniform polymer chain length at the surface of each core particle. Hereinbelow, this step will be described with respect to the case of the atom transfer radical polymerization and the case of the nitroxide-mediated polymerization.

(Atom Transfer Radical Polymerization)

The case where the living radical polymerization is the atom transfer radical polymerization will be described.

At the core particle surface, the atom transfer radical polymerization initiation group is introduced through polymerization of the polymerizable monomer of formula (3-II) or (3-III) or through the reaction formulas (3-I) to (3-IV).

After the core particles are dispersed in the reaction solvent, a polymerizable monomer for constituting the polymer chain and a transfer metal complex are added and then an atmosphere of the reaction system is replaced with inert gas to effect the atom transfer radical polymerization.

The reaction solvent is not particularly limited so long as the core particles are dispersed and are not dissolved in the reaction solvent. Examples of the reaction solvent may include those, such as dimethyl sulfoxide, described in the embodiments of First invention. These may be used singly or in combination of two or more species.

As the inert gas, it is possible to use nitrogen or argon.

The transfer metal complex used comprises halogenated metal and a ligand. As a metal species of the halogenated metal, transfer metal from Ti (atomic member: 22) to Zn (atomic number: 30) are preferred. Of these, Fe, Co, Ni and Cu are further preferred. As the halogenated metal, cuprous chloride and cuprous bromide are particularly preferred.

The ligand is not particularly limited so long as it is capable of coordinating with the halogenated metal. Example thereof may include those, described in the embodiments of First invention and Second invention.

The metal transfer complex may preferably be added in an amount of 0.001-10 wt. %, more preferably 0.05-5 wt. %, with respect to the polymerizable monomer constituting the polymer chain.

A polymerization temperature is in the range of 40-100° C., preferably 50-80° C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the atom transfer radical polymerization initiation group fixed at the particle surface is selected. More specifically, with respect to the particles obtained through the reaction formula (2-I), 2-bromo ethyl isobutyrate is preferred. With respect to the particles obtained through the reaction formula (2-II), 2-bromo ethyl propionate is preferred.

After the reaction, the formed particles are washed and recovered by an appropriate method, such as filtration, decantation, centrifugation, or the like, and then are subjected to drying and classification to obtain electrophoretic particles.

(Nitroxide-Mediated Polymerization)

The nitroxide-mediated polymerization will be described.

By using, as the core particles, the particles to which the atom nitroxide-mediated polymerization initiation group is introduced through the reaction formula (3-V), it is possible to easily form polymer chains having a uniform chain length at the surfaces of core particles.

After the core particles are dispersed in the reaction solvent, a polymerizable monomer for constituting the polymer chain is added and then an atmosphere of the reaction system is replaced with inert gas to effect the atom transfer radical polymerization.

The reaction solvent is not particularly limited so long as the core particles are dispersed and are not dissolved in the reaction solvent. Examples of the reaction solvent may include dimethyl sulfoxide, dimethylformamide, tetrahydrofuran, acetonitrile, benzene, toluene, xylene, etc. Alternatively, the polymerization may be performed without using the reaction solvent.

As the inert gas, it is possible to use nitrogen or argon.

A polymerization temperature is in the range of 40-100° C., preferably 50-90° C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the nitroxide-mediated polymerization initiation group fixed at the particle surface is selected. More specifically, with respect to the particles obtained through the reaction formula (3-V), Nitroxide 1 is preferred.

After the reaction, the formed particles are washed and purified by separation by an appropriate method, such as filtration, decantation, centrifugation, or the like to obtain electrophoretic particles.

(Charged Function and Dispersion Function of Polymer Chain)

The electrophoretic particles have an electric charge function and a dispersion function at an outermost core portion, so that these functions are also required with respect to the polymer chain of the particles obtained by the above described living radical polymerization.

First, the dispersion function will be described.

In order to provide the polymer chain with the dispersion function, it is necessary to select a polymer having a high affinity with the electrophoretic dispersion medium. The high affinity means that the polymer chain and the electrophoretic dispersion medium are excellent in mutual solubility without causing phase separation. The polymer chain has a steric-exclusion effect of preventing agglomeration between particles by possessing an expanse in the electrophoretic dispersion medium.

As the polymerizable monomer providing the polymer chain having the dispersion function, as described above, the resultant polymer is required to have the high affinity with the electrophoretic dispersion medium. Examples of the polymerizable monomer may include 1-hexene, 1-heptene, 1-octene, 1-decene, butadiene, isoprene, isobutylene, etc. These may be used singly or in combination of two or more species.

Next, the charge function will be described.

As the polymerizable monomer providing the polymer chain having the charge function, it is possible to use a basic polymerizable monomer, an acidic polymerizable monomer, and a fluorine-containing polymerizable monomer.

Examples of the basic polymerizable monomer may include those, such as methyl (meth-)acrylate, described in the embodiments of First invention.

When an acidic additive is added to the polymer chain obtained from the basic polymerizable monomer, an acid-base interaction between these substances are caused to occur, thus imparting positive chargeability to the particles. Further, the polymer chain having the charge function can also have the dispersion function by appropriately selecting the kinds of the basic polymerizable monomer and the acidic additive and by appropriately adjusting an addition amount of the acidic additive, so that it is not necessary to effect grafting of the polymerizable monomer having the dispersion substance to the particle.

As the acidic additive, an acidic substance which is soluble in the electrophoretic dispersion medium is preferred. For example, it is possible to use rosin acid, rosin ester, rosin acid derivative, poly(meth-)acrylic acid, polyisobutylenesuccinic acid anhydride, etc.

An addition amount of the acidic additive may appropriately added depending on the kind thereof but may preferably be 0.001-10 wt. %, preferably 0.01-5 wt. %, with respect to the electrophoretic dispersion medium.

On the other hand, examples of the acidic polymerizable monomer may include those, such as (meth-)acrylic acid, described in the embodiments of First invention.

When a basic additive is added to the polymer chain obtained from the acidic polymerizable monomer, an acid-base interaction between these substances are caused to occur, thus imparting negative chargeability to the particles. Further, the polymer chain having the charge function can also have the dispersion function by appropriately selecting the kinds of the acidic polymerizable monomer and the basic additive and by appropriately adjusting an addition amount of the basic additive, so that it is not necessary to effect grafting of the polymerizable monomer having the dispersion function to the particle.

As the basic additive, a basic substance which is soluble in the electrophoretic dispersion medium is preferred. For example, it is possible to use polyisobutylsuccinimide, polyvinyl pyridine, pyridine, lecithin, polyvinyl acetate, polyethylene oxide, polymethyl methacrylate, polydecyl methacrylate, polydodecyl methacrylate, polyoctadecyl methacrylate, polyacrylamide, polyester, polyether, etc.

An addition amount of the basic additive may appropriately added depending on the kind thereof but may preferably be 0.001-10 wt. %, preferably 0.01-5 wt. %, with respect to the electrophoretic dispersion medium.

Further, examples of the fluorine-containing polymerizable monomer may include: fluoromethyl (meth-)acrylate, as described in the embodiments of First invention.

The polymer chain obtained from the fluorine-containing polymerizable monomer has fluorine (atom) which has a large electronegativity, so that it is possible to impart negative chargeability to the particle. The polymer chain has such an affinity with the electrophoretic dispersion medium that it is not so high, thus being preferably one obtained through block polymerization between the fluorine-containing polymerizable monomer and the polymerizable monomer having the dispersion function.

The grafted polymer chain is characterized in that it has a molecular weight distribution index (weight-average molecular weight/number-average molecular weight) which is controlled to be not more than 1.8, preferably not more than 1.5, further preferably not more than 1.3. When the molecular weight distribution index of the grafted polymer chain exceeds 1.8, it is difficult to say that the chain length of polymer chain is uniform and the electrophoretic particles are undesirably liable to cause unevenness in dispersibility and chargeability.

The number-average molecular weight may appropriately be determined depending on whether the polymer chain is of the dispersion function-type or the charge function-type. In the case where the polymer chain is of the dispersion function-type, the number-average molecular weight may preferably be in the range of 500-1,000,000, more preferably 1,000-500,000. Below 500, it is difficult for the polymer chain to have the dispersion function. Above 1,000,000, the solubility in the electrophoretic dispersion medium is undesirably lowered.

A graft density of the polymer chain can be controlled by a degree of introduction of the living radical polymerization initiation group polymerization initiation group or the nitroxide-mediated polymerization initiation group. Further, the chain length of the polymer chain can be controlled by the addition amount of the polymerizable monomer, the polymerization time, etc.

By performing the above described agglomeration step and the melting step, it is possible to obtain composite fine particles having a narrow particle size distribution. The thus obtained composite particles have an average particle size of 0.5-10 μm and a value of coefficient of variation (CV value), of particle size distribution, of not more than 15%.

The composite particles have the narrow particle size distribution and are used as the core particles to form the polymer chain through the living radical polymerization, so that the finally obtained electrophoretic particles have a uniform particle size. As a result, by using the electrophoretic particles, a resultant electrophoretic display apparatus is improved in display quality.

Incidentally, the particle size distribution CV value is represented by the following equation:

$$CV(\%) = \{\text{standard deviation of particle (μm)/average particle size (μm)}\} \times 100$$

A smaller CV value means a narrower particle size distribution.

(Constitution of Electrophoretic Particles to Electrophoretic Display Device)

The electrophoretic particles obtained through the production processes thereof described in the embodiments of this (Third) invention are applicable to the electrophoretic display devices described in the embodiments of First invention with reference to FIGS. 1 to 4.

Hereinbelow, First invention will be described more specifically based on Examples but is not limited thereto.

EXAMPLE 1-1

A suspension liquid is prepared by uniformly dispersing a core composition comprising 15 wt. parts of titanium oxide particles which has been subjected to hydrophobicity-imparting treatment, and 1.7 wt. parts of 2,2'-azobisisobutyronitrile (AIBN), 130 wt. parts of 4-ethylstyrene, and 2 wt. parts of divinylbenzene, by a homogenizer. In a dispersion medium comprising 400 wt. parts of a sodium dodecyl sulfonate aqueous solution (concentration: 0.05 wt. %) and 20 wt. parts of calcium phosphate dispersed therein, the suspension liquid is added. The resultant liquid is stirred at high speed by the homogenizer to prepare a uniform suspension liquid. The suspended core composition has an average particle size of about 2.0 μm. Thereafter, the uniform suspension liquid is subjected to suspension polymerization at 80° C. in a nitrogen atmosphere to obtain core particles.

In accordance with the above described reaction formula (1-VI), core particles to which a nitroxide-mediated polymerization initiation group is introduced are obtained and then are dispersed in dimethylsulfoxide. In the resultant system, dodecyl acrylate is added. The reaction system is aerated with nitrogen and subjected to nitroxide-mediated polymerization at 80° C. for a predetermined time. In this case, Nitroxide 1 as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying and classification to obtain objective electrophoretic particles. An average particle size of the electrophoretic particles is about 2.1 μm.

The electrophoretic particles are well dispersed in tetrahydrofuran (THF), so that it is possible to confirm that dodecyl polyacrylate is grafted at the particle surface. Further, when a polymer obtained from Nitroxide 1 added as the free polymerization initiation group is subjected to measurement of molecular weight and molecular weight distribution, the polymer has a number-average molecular weight of about 50,000 and a molecular weight dispersion index (weight-average molecular weight/number-average molecular weight) of 1.30. As a result, it is possible to confirm that the polymer chains grafted to the core particles have a uniform chain length.

An electrophoretic dispersion liquid is prepared by using 5 wt. % of the electrophoretic particles (white particles), 0.1 wt. % of a colorant ("Oil Blue N", mfd. by Aldrich Co.), 2.5 wt.

% of rosin acid (acidic additive), and 92.9 wt. % of an electrophoretic dispersion medium ("Isoper H, mfd. by Exxon Corp.). The electrophoretic particles are positively charged by acid-base interaction between the grafted dodecyl polyacrylate and rosin acid. Further, the grafted dodecyl polyacrylate has an expanse in the electrophoretic dispersion medium, thus having also a dispersion function.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display for a long time by driving it at a drive voltage of ±10V, the electrophoretic particles are excellent in dispersibility and chargeability, and it is possible to effect clear blue/white display.

EXAMPLE 1-2

A plurality of microcapsules 1i each containing an electrophoretic dispersion liquid prepared in the same manner as in Example 1-1 are prepared by in-situ polymerization method. Each microcapsule is formed of urea-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display for a long time by driving it at a drive voltage of ±10V, the electrophoretic particles are excellent in dispersibility and chargeability, and it is possible to effect clear blue/white display.

EXAMPLE 1-3

A suspension liquid is prepared by uniformly dispersing a core composition comprising 10 wt. parts of carbon black particles which has been subjected to hydrophobicity-imparting treatment, and 1.7 wt. parts of 2,2'-azobisisobutyronitrile (AIBN), 130 wt. parts of styrene, 7 wt. parts of ethylene glycol methacrylate (mixture of compounds of formula (1-I) (n=4 and 5); trade name "Blenmer PE-200", mfd. by NOF Corp.), and 2 wt. parts of divinylbenzene, by a homogenizer. In a dispersion medium comprising 1800 wt. parts of a sodium dodecyl sulfonate aqueous solution (concentration: 0.05 wt. %) and 90 wt. parts of calcium phosphate dispersed therein, the suspension liquid is added. The resultant liquid is stirred at high speed by the homogenizer to prepare a uniform suspension liquid. The suspended core composition has an average particle size of about 1.5 µm. Thereafter, the uniform suspension liquid is subjected to suspension polymerization at 80° C. in a nitrogen atmosphere to obtain core particles provided with hydroxyl group of each particle surface.

In accordance with the above described reaction formula (1-II), core particles to which an atom transfer radical polymerization initiation group is introduced are obtained and then are dispersed in dimethylsulfoxide. In the resultant system, octadecyl methacrylate, cuprous bromide, and (−)-sparteine are added. The reaction system is aerated with nitrogen and subjected to atom transfer radical polymerization at 70° C. for a predetermined time. In this case, 2-bromoethyl isobutylate as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying and classification to obtain objective electrophoretic particles 4e. An average particle size of the electrophoretic particles is about 1.7 µm.

The electrophoretic particles 4e are well dispersed in tetrahydrofuran (THF), so that it is possible to confirm that octadecyl polymethacrylate is grafted at the particle surface. Further, when a polymer obtained from 2-bromo ethyl isobutylate added as the free polymerization initiation group is subjected to measurement of molecular weight and molecular weight distribution, the polymer has a number-average molecular weight of about 80,000 and a molecular weight dispersion index (weight-average molecular weight/number-average molecular weight) of 1.06. As a result, it is possible to confirm that the polymer chains grafted to the core particles have a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the grafted octadecyl polymethacrylate and rosin acid. Further, the grafted octadecyl polymethacrylate has an expanse in the electrophoretic dispersion medium, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10V, the electrophoretic particles 4e are excellent in dispersibility and chargeability, and it is possible to effect clear white/black display.

EXAMPLE 1-4

A plurality of microcapsules 4j each containing an electrophoretic dispersion liquid prepared in the same manner as in Example 1-3 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10V, the electrophoretic particles are excellent in dispersibility and chargeability, and it is possible to effect clear white/black display.

EXAMPLE 1-5

A suspension liquid is prepared by uniformly dispersing a core composition comprising 5 wt. parts of carbon black particles which has been subjected to hydrophobicity-imparting treatment, 10 wt. parts of Oil Black HBB, 1.7 wt. parts of 2,2'-azobisisobutyronitrile (AIBN), 130 wt. parts of styrene, 7 wt. parts of ethylene glycol methacrylate (mixture of compounds of formula (1-I) (n=4 and 5); trade name "Blenmer PE-200", mfd. by NOF Corp.), and 2 wt. parts of divinylbenzene, by a homogenizer. In a dispersion medium comprising 1800 wt. parts of a sodium dodecyl sulfonate aqueous solution (concentration: 0.05 wt. %) and 90 wt. parts of calcium phosphate dispersed therein, the suspension liquid is added. The resultant liquid is stirred at high speed by the homogenizer to prepare a uniform suspension liquid. The suspended core composition has an average particle size of about 1.5 µm. Thereafter, the uniform suspension liquid is subjected to suspension polymerization at 80° C. in a nitrogen atmosphere to obtain core particles provided with hydroxyl group of each particle surface.

In accordance with the above described reaction formula (1-II), core particles to which an atom transfer radical polymerization initiation group is introduced are obtained and then are dispersed in dimethylsulfoxide. In the resultant system, methacrylic acid, cuprous bromide, and (−)-sparteine are added. The reaction system is aerated with nitrogen and subjected to atom transfer radical polymerization at 70° C. for a predetermined time. After methacrylic acid is consumed, 1-hexene is added to the reaction system so as to provide a molar ratio of (methacrylic acid):(1-hexene)=1:9, thus forming a grafted polymer chain of block copolymer. In this case, 2-bromoethyl isobutylate as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying and classification to obtain objective electrophoretic particles 4e. An average particle size of the electrophoretic particles is about 1.6 µm.

The electrophoretic particles 4e are well dispersed in tetrahydrofuran (THF), so that it is possible to confirm that a copolymer of polymethacrylic acid and polyhexene is grafted at the particle surface. Further, when a polymer obtained from 2-bromo ethyl isobutylate added as the free polymerization initiation group is subjected to measurement of molecular weight and molecular weight distribution, the polymer has a number-average molecular weight of about 70,000 and a molecular weight dispersion index (weight-average molecular weight/number-average molecular weight) of 1.25. As a result, it is possible to confirm that the polymer chains grafted to the core particles are a black copolymer having a uniform chain length.

An electrophoretic dispersion liquid is prepared by using 1 wt. % of the electrophoretic particles 4e (black particles), 0.5 wt. % of polyisobutylenesuccinimide (basic additive), and 98.5 wt. % of an electrophoretic dispersion medium 4f ("Isoper H, mfd. by Exxon Corp.). The electrophoretic particles 4e are negatively charged by acid-base interaction between the polymethacrylic acid site of the grafted block polymer and polyisobutylenesuccinimide. Further, the polyhexene site of the grafted block copolymer has an expanse in the electrophoretic dispersion medium, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10V, the electrophoretic particles 4e are excellent in dispersibility and chargeability, and it is possible to effect clear white/black display.

EXAMPLE 1-6

A plurality of microcapsules 4j each containing an electrophoretic dispersion liquid prepared in the same manner as in Example 1-5 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10V, the electrophoretic particles are excellent in dispersibility and chargeability, and it is possible to effect clear white/black display.

EXAMPLE 1-7

A suspension liquid is prepared by uniformly dispersing a core composition comprising 20 wt. parts of Oil Black HBB, 1.7 wt. parts of 2,2'-azobisisobutyronitrile (AIBN), 117 wt. parts of styrene, 7 wt. parts of ethylene glycol methacrylate (mixture of compounds of formula (1-I) (n=4 and 5); trade name "Blenmer PE-200", mfd. by NOF Corp.), and 15 wt. parts of divinylbenzene, by a homogenizer. In a dispersion medium comprising 1800 wt. parts of a sodium dodecyl sulfonate aqueous solution (concentration: 0.05 wt. %) and 90 wt. parts of calcium phosphate dispersed therein, the suspension liquid is added. The resultant liquid is stirred at high speed by the homogenizer to prepare a uniform suspension liquid. The suspended core composition has an average particle size of about 1.5 µm. Thereafter, the uniform suspension liquid is subjected to suspension polymerization at 80° C. in a nitrogen atmosphere to obtain core particles provided with hydroxyl group of each particle surface.

In accordance with the above described reaction formula (1-IV), core particles to which an atom transfer radical polymerization initiation group is introduced are obtained and then are dispersed in dimethylformamide. In the resultant system, aminomethyl methacrylated, cuprous bromide, and 4,4-di-(n-heptyl)-2,2'-bipyridyl are added. The reaction system is aerated with nitrogen and subjected to atom transfer radical polymerization at 70° C. for a predetermined time. After aminoethyl methacrylate is consumed, 1-hexene is added to the reaction system so as to provide a molar ratio of (aminoethyl methacrylate):(1-hexene)=1:9, thus forming a grafted polymer chain of block copolymer. In this case, 2-bromoethyl isobutylate as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying and classification to obtain objective electrophoretic particles 4e. An average particle size of the electrophoretic particles is about 1.6 µm.

The electrophoretic particles 4e are well dispersed in tetrahydrofuran (THF), so that it is possible to confirm that a copolymer of polyaminoethylmethacrylate and polyhexene is grafted at the particle surface. Further, when a polymer obtained from 2-bromo ethyl isobutylate added as the free polymerization initiation group is subjected to measurement of molecular weight and molecular weight distribution, the polymer has a number-average molecular weight of about 60,000 and a molecular weight dispersion index (weight-average molecular weight/number-average molecular weight) of 1.27. As a result, it is possible to confirm that the polymer chains grafted to the core particles are a black copolymer having a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the polyaminoethylmethacrylate site of the grafted block polymer and rosin acid. Further, the polyhexene site of the grafted block copolymer has an expanse in the electrophoretic dispersion medium, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10V, the electrophoretic particles 4e are excellent in dispersibility and chargeability, and it is possible to effect clear white/black display.

EXAMPLE 1-8

A plurality of microcapsules 4j each containing an electrophoretic dispersion liquid prepared in the same manner as in Example 1-7 are prepared by in-situ polymerization method. Each microcapsule is formed of melamine-formaldehyde resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10V, the electrophoretic particles are excellent in dispersibility and chargeability, and it is possible to effect clear white/black display.

EXAMPLE 1-9

An electrophoretic dispersion liquid is prepared by using 5 wt. % of electrophoretic particles (white particles) obtained in the same manner was in Example 1-1, 2.5 wt. % of rosin acid (acidic additive), electrophoretic particles (black particles) obtained in the same manner as in Example 1-5, 1.5 wt. % of polyisobutylenesuccinimide (basic additive), and 88 wt. % of an electrophoretic dispersion medium ("Isopar H, mfd. by Exxon Corp.). The white electrophoretic particles are positively charged and the black electrophoretic particles are negatively charged in the electrophoretic dispersion medium.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 3) for a long time by driving it at a drive voltage of ±10V, the two types of white and black electrophoretic particles are excellent in dispersibility and chargeability, and it is possible to effect clear white/black display.

EXAMPLE 1-10

A plurality of microcapsules 1i each containing an electrophoretic dispersion liquid prepared in the same manner as in Example 1-9 are prepared by in-situ polymerization method. Each microcapsule is formed of melamine-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display for a long time by driving it at a drive voltage of ±10V, the two types of white and black electrophoretic particles are excellent in dispersibility and chargeability, and it is possible to effect clear white/black display.

Hereinbelow, Second invention will be described more specifically based on Examples but is not limited thereto.

EXAMPLE 2-1

A core composition comprising 15 wt. parts of titanium oxide particles which has been subjected to hydrophobicity-imparting treatment, and 1.7 wt. parts of azobisisobutyronitrile (AIBN), 130 wt. parts of styrene, 5 wt. parts of 2-hydroxyethylmethacrylate (formula (2-I), n=1), and 2 wt. parts of divinylbenzene is added in a solution of 72 wt. parts of polyvinyl alcohol dissolved in 900 wt. parts of methanol. The mixture is subjected to dispersion polymerization at 65° C. in a nitrogen atmosphere to obtain black core particles (Composite fine particles comprising a polymer and the pigment) provided with hydroxyl group at each surface. The core particles have an average particle size of 4.2 μm and a particle size distribution CV value of 5.5%.

In accordance with the above described reaction formula (2-I), core particles to which a nitroxide-mediated polymerization initiation group is introduced are obtained and then are dispersed in dimethylsulfoxide. In the resultant system, dodecyl acrylate is added. The reaction system is aerated with nitrogen and subjected to nitroxide-mediated polymerization at 75° C. for a predetermined time. In this case, NItroxide 1 as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying to obtain objective electrophoretic particles 1e. An average particle size of the electrophoretic particles 1e is 4.3 μm, and a particle size distribution CV value thereof is 5.6%.

The electrophoretic particles 1e are well dispersed in tetrahydrofuran (THF), so that it is possible to confirm that dodecyl polyacrylate is grafted at the particle surface. Further, when a polymer obtained from Nitroxide 1 added as the free polymerization initiation group is subjected to measurement of molecular weight and molecular weight distribution, the polymer has a number-average molecular weight of about 50,000 and a molecular weight dispersion index (weight-average molecular weight/number-average molecular weight) of 1.30. As a result, it is possible to confirm that the polymer chains grafted to the core particles have a uniform chain length.

An electrophoretic dispersion liquid is prepared by using 5 wt. % of the electrophoretic particles 1e (white particles), 0.1 wt. % of a colorant ("Oil Blue N", mfd. by Aldrich Co.), 2.5 wt. % of rosin acid (acidic additive), and 92.9 wt. % of an electrophoretic dispersion medium 1f ("Isoper H, mfd. by Exxon Corp.). The electrophoretic particles 1e are positively charged by acid-base interaction between the grafted dodecyl polyacrylate and rosin acid. Further, the grafted dodecyl polyacrylate has an expanse in the electrophoretic dispersion medium 1f, thus having also a dispersion function.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 2) for a long time by driving it at a drive voltage of ±10V, the electrophoretic particles 1e are excellent in dispersibility and chargeability, and it is possible to effect clear blue/white display.

EXAMPLE 2-2

A plurality of microcapsules 1i each containing an electrophoretic dispersion liquid prepared in the same manner as in Example 1-1 are prepared by in-situ polymerization method. Each microcapsule is formed of urea-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display (FIG. 2) for a long time by driving it at a drive voltage of ±10V, the electrophoretic particles 1e are excellent in dispersibility and chargeability, and it is possible to effect clear blue/white display.

EXAMPLE 2-3

A core composition comprising 10 wt. parts of carbon black particles, 1.7 wt. parts of azobisisobutyronitrile (AIBN), 130 wt. parts of styrene, 5 wt. parts of 2-hydroxyethylmethacrylate (formula (2-I), n=1), and 2 wt. parts of divinylbenzene is added in a solution of 72 wt. parts of polyvinyl alcohol dissolved in 900 wt. parts of methanol. The mixture is subjected to dispersion polymerization at 65° C. in a nitrogen atmosphere to obtain black core particles (Composite fine particles comprising a polymer and the pigment) provided with hydroxyl group at each surface. The core particles have an average particle size of 4.2 μm and a particle size distribution CV value of 5.5%.

In accordance with the above described reaction formula (2-I), core particles to which a an atom transfer radical polymerization initiation group is introduced are obtained and then are dispersed in dimethylsulfoxide. In the resultant system, octadecyl methacrylate, cuprous bromide, and (–)-sparteine are added. The reaction system is aerated with nitrogen and subjected to atom transfer radical polymerization at 70° C. for a predetermined time. In this case, 2-bromo ethyl isobutylate as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying to obtain objective electrophoretic particles 1e. An average particle size of the electrophoretic particles 1e is 4.3 μm, and a particle size distribution CV value thereof is 5.6%.

The electrophoretic particles 4e are well dispersed in tetrahydrofuran (THF), so that it is possible to confirm that octadecyl polymethacrylate is grafted at the particle surface. Further, when a polymer obtained from 2-bromo ethyl isobutylate added as the free polymerization initiation group is subjected to measurement of molecular weight and molecular weight distribution, the polymer has a number-average molecular weight of about 80,000 and a molecular weight dispersion index (weight-average molecular weight/number-average molecular weight) of 1.06. As a result, it is possible to confirm that the polymer chains grafted to the core particles have a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the grafted octadecyl polymethacrylate and rosin acid. Further, the grafted octadecyl polymethacrylate has an expanse in the electrophoretic dispersion medium, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display (FIG. 5) for a long time by driving it at a drive voltage of ±10V, the electrophoretic particles 4e are excellent in dispersibility and chargeability, and it is possible to effect clear white/black display.

EXAMPLE 2-4

A plurality of microcapsules 4j each containing an electrophoretic dispersion liquid prepared in the same manner as in Example 1-1 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display (FIG. 5) for a long time by driving it at a drive voltage of ±10V, the electrophoretic particles are excellent in dispersibility and chargeability, and it is possible to effect clear white/black display.

EXAMPLE 2-5

A core composition comprising 20 wt. parts of azo-type dye ("Oil black HBB", mfd. by Orient Chemical Industries, Ltd.), 1.7 wt. parts of azobisisobutyronitrile (AIBN), 170 wt. parts of styrene, 8 wt. parts of methacrylate having atom transfer radical polymerization initiation group) formula (2-I) shown below), and 2 wt. parts of divinylbenzene is added in a solution of 100 wt. parts of polyvinyl pyrrolidone dissolved in 900 wt. parts of methanol.

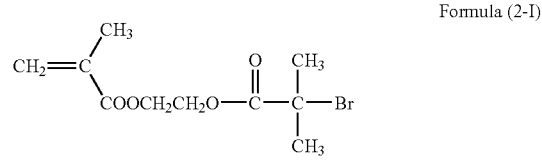

Formula (2-I)

The mixture is subjected to dispersion polymerization at 65° C. in a nitrogen atmosphere to obtain black core particles (Composite fine particles comprising a polymer and the dye) provided with atom transfer radical polymerization initiation group. The core particles have an average particle size of 1.4 μm and a particle size distribution CV value of 5.5%.

The core particles are dispersed in dimethylformamide. In the resultant system, methacrylic acid, cuprous bromide, and (–)-sparteine are added. The reaction system is aerated with nitrogen and subjected to atom transfer radical polymerization at 70° C. for a predetermined time. After methacrylic acid is consumed, 1-hexene is added to the reaction system so as to provide a molar ratio of (methacrylic acid):(1-hexene)=1:9, thus forming a grafted polymer chain of block copolymer. In this case, 2-bromo ethyl isobutylate as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying to obtain objective electrophoretic particles $4e$. An average particle size of the electrophoretic particles $4e$ is 1.5 μm, and a particle size distribution CV value thereof is 2.6%.

The electrophoretic particles $4e$ are well dispersed in tetrahydrofuran (THF), so that it is possible to confirm that a copolymer of polymethacrylic acid and polyhexene is grafted at the particle surface. Further, when a polymer obtained from 2-bromo ethyl isobutylate added as the free polymerization initiation group is subjected to measurement of molecular weight and molecular weight distribution, the polymer has a number-average molecular weight of about 40,000 and a molecular weight dispersion index (weight-average molecular weight/number-average molecular weight) of 1.25. As a result, it is possible to confirm that the polymer chains grafted to the core particles are a black copolymer having a uniform chain length.

An electrophoretic dispersion liquid is prepared by using 1 wt. % of the electrophoretic particles $4e$ (black particles), 0.5 wt. % of polyisobutylenesuccinimide (basic additive), and 98.5 wt. % of an electrophoretic dispersion medium $4f$ ("Isoper H, mfd. by Exxon Corp.). The electrophoretic particles $4e$ are negatively charged by acid-base interaction between the polymethacrylic acid site of the grafted block polymer and polyisobutylenesuccinimide. Further, the polyhexene site of the grafted block copolymer has an expanse in the electrophoretic dispersion medium, thus having also a dispersion function.

The electrophoretic dispersion liquid is injected into a cell by using nozzles according to an ink jet method to provide an electrophoretic display device, as shown in FIG. $4(a)$, which is connected with a voltage application circuit.

When the resultant electrophoretic display device is subjected to contrast display for a long time by driving it at a drive voltage of ±10V, the electrophoretic particles $4e$ are excellent in dispersibility and chargeability, and it is possible to effect clear white/black display.

EXAMPLE 2-6

A plurality of microcapsules $4j$ each containing an electrophoretic dispersion liquid prepared in the same manner as in Example 2-5 are prepared by interfacial polymerization method. Each microcapsule is formed of polyamide resin as a film-forming material. An electrophoretic display device, as shown in FIG. $4(b)$, which is connected with a voltage application circuit is prepared by disposing the plurality of microcapsules $4j$ on a first substrate $4a$ by use of nozzles according to the ink jet method.

When the resultant electrophoretic display device is subjected to contrast display for a long time by driving it at a drive voltage of ±10V, the electrophoretic particles are excellent in dispersibility and chargeability, and it is possible to effect clear white/black display.

EXAMPLE 2-7

A core composition comprising 5 wt. parts of carbon black, 10 wt. parts of Oil black HBB, and 1.7 wt. parts of 2,2'-azobisisobutyronitrile (AIBN), 115 wt. parts of styrene, 7 wt. parts of ethylene glycol methacrylate (mixture of compounds of formula (2-I) (n=4 and 5); tradename: "Blenmer PE-200", mfd. by NOF Corp.), and 2 wt. parts of divinylbenzene is added in a solution of 54 wt. parts of polyhydroxy styrene dissolved in 900 wt. parts of methanol. The mixture is subjected to dispersion polymerization at 75° C. in a nitrogen atmosphere to obtain black core particles (Composite fine particles comprising a polymer, the pigment, and the dye). The core particles have an average particle size of 2.8 μm and a particle size distribution CV value of 4.6%.

In accordance with the above described reaction formula (2-III), core particles to which an atom transfer radical polymerization initiation group is introduced are obtained and then are dispersed in dimethylformamide. In the resultant system, aminomethyl methacrylated, cuprous bromide, and 4,4-di-(n-heptyl)-2,2'-bipyridyl are added. The reaction system is aerated with nitrogen and subjected to atom transfer radical polymerization at 70° C. for a predetermined time. After aminoethyl methacrylate is consumed, 1-hexene is added to the reaction system so as to provide a molar ratio of (aminoethyl methacrylate):(1-hexene)=1:9, thus forming a grafted polymer chain of block copolymer. In this case, 2-bromoethyl isobutylate as a free polymerization initiation group (radical) is added in the reaction system in advance so as to provide an index of molecular weight and molecular weight distribution of a polymer chain grafted to the particle surface.

After the polymerization, the resultant polymer particles are washed, followed by drying to obtain objective electrophoretic particles $1e$. An average particle size of the electrophoretic particles $1e$ is 3.0 μm, and a particle size distribution CV value thereof is 4.8%.

The electrophoretic particles $4e$ are well dispersed in tetrahydrofuran (THF), so that it is possible to confirm that a copolymer of polyaminoethylmethacrylate and polyhexene is grafted at the particle surface. Further, when a polymer obtained from 2-bromo ethyl isobutylate added as the free polymerization initiation group is subjected to measurement of molecular weight and molecular weight distribution, the polymer has a number-average molecular weight of about 60,000 and a molecular weight dispersion index (weight-average molecular weight/number-average molecular weight) of 1.27. As a result, it is possible to confirm that the polymer chains grafted to the core particles are a black copolymer having a uniform chain length.

An electrophoretic dispersion liquid is prepared by using 1 wt. % of the electrophoretic particles $4e$ (black particles), 0.5 wt. % of rosin acid (acidic additive), and 98.5 wt. % of an electrophoretic dispersion medium $4f$ ("Isoper H, mfd. by Exxon Corp.). The electrophoretic particles $4e$ are positively charged by acid-base interaction between the polyaminoethylmethacrylate site of the grafted block polymer and rosin acid. Further, the polyhexene site of the grafted block copolymer has an expanse in the electrophoretic dispersion medium, thus having also a dispersion function.

The electrophoretic dispersion liquid is injected into a cell by using nozzles according to an ink jet method to provide an electrophoretic display device, as shown in FIG. $4(a)$, which is connected with a voltage application circuit.

When the resultant electrophoretic display device is subjected to contrast display for (FIG. 5) a long time by driving it at a drive voltage of ±10V, the electrophoretic particles $4e$ are excellent in dispersibility and chargeability, and it is possible to effect clear white/black display.

EXAMPLE 2-8

A plurality of microcapsules $4j$ each containing an electrophoretic dispersion liquid prepared in the same manner as in Example 2-7 are prepared by in-situ polymerization method. Each microcapsule is formed of melamine-formaldehyde resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display (FIG. 5) for a long time by driving it at a drive voltage of ±10V, the electrophoretic particles are excellent in dispersibility and chargeability, and it is possible to effect clear white/black display.

EXAMPLE 2-9

An electrophoretic dispersion liquid is prepared by using 5 wt. % of electrophoretic particles 1e (white particles) obtained in the same manner was in Example 2-1, 2.5 wt. % of rosin acid (acidic additive), electrophoretic particles 1e (black particles) obtained in the same manner as in Example 1-5, 1.5 wt. % of polyisobutylenesuccinimide (basic additive), and 88 wt. % of an electrophoretic dispersion medium if ("Isopar H, mfd. by Exxon Corp.). The white electrophoretic particles 1e are positively charged and the black electrophoretic particles 1e are negatively charged in the electrophoretic dispersion medium 1f.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 3) for a long time by driving it at a drive voltage of ±10V, the two types of white and black electrophoretic particles 1e are excellent in dispersibility and chargeability, and it is possible to effect clear white/black display.

EXAMPLE 2-10

A plurality of microcapsules 1i each containing an electrophoretic dispersion liquid prepared in the same manner as in Example 2-9 are prepared by in-situ polymerization method. Each microcapsule is formed of melamine-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display for a long time by driving it at a drive voltage of ±10V, the two types of white and black electrophoretic particles 1e are excellent in dispersibility and chargeability, and it is possible to effect clear white/black display.

Hereinbelow, Third invention will be described more specifically based on Examples but is not limited thereto.

EXAMPLE 3-1

In 200 wt. parts of aqueous solution containing 1.6 wt. % of anionic surfactant (sodium dodecylbenzenesulfonate; "NEOGEN SC", mfd. by Dai-Ichi Kogyo Seiyaku Co., Ltd.), 130 wt. parts of 4-ethylstyrene and 2 wt. parts of divinylbenzene are emulsified and thereto, 16 wt. parts of aqueous solution containing 6.5 wt. % of potassium persulfate dissolved therein is added, followed by emulsion polymerization to obtain a dispersion liquid of polymer fine particles having an average particle size of 0.3 μm.

A colorant dispersion liquid is prepared by dispersing 15 wt. parts of titanium oxide particles (average particle size: 0.1 μm) in 75 wt. parts of aqueous solution containing anionic surfactant (NEOGEN SC) by means of a homogenizer.

In a mixture of the above prepared polymer fine particle dispersion liquid and colorant dispersion liquid, 80 wt. parts of aqueous solution containing 0.7 wt. % of cationic surfactant (alkyldimethylbenzylammonium chloride; "SANISOL B-50", mfd. by Kao Corp.) is added and dispersed by the homogenizer, followed by stirring at 45° C. for 1 hour. When the mixture is observed through an optical microscope, it is possible to confirm formation of agglomeration particles which comprise the polymer fine particles and titanium oxide particles and have an average particle size of about 6 μm.

After stirring at 95° C. for 6 hours, the reaction mixture is gradually cooled to room temperature and washed to obtain white composite particles comprising the polymer and the colorant (pigment). The composite particles have an average particle size of 5.5 μm and a particle distribution CV value of 7.8%.

In accordance with the above described reaction formula (3-V), composite particles to which a nitroxide-mediated polymerization initiation group is introduced are obtained and then are dispersed in dimethylsulfoxide. In the resultant system, dodecyl acrylate is added. The reaction system is aerated with nitrogen and subjected to nitroxide-mediated polymerization at 75° C. for a predetermined time. In this case, NItroxide 1 as a free polymerization initiation group (radical) is added in the reaction system in advance so as to provide an index of molecular weight and molecular weight distribution of a polymer chain grafted to the particle surface.

After the polymerization, the resultant particles are washed and dried to provide objective electrophoretic particles 1e, which have an average particle size of 5.8 μm and a particle size distribution CV value of 8.2%.

The electrophoretic particles are well dispersed in tetrahydrofuran (THF), so that it is possible to confirm that dodecyl polyacrylate is grafted at the particle surface. Further, when a polymer obtained from Nitroxide 1 added as the free polymerization initiation group is subjected to measurement of molecular weight and molecular weight distribution, the polymer has a number-average molecular weight of about 80,000 and a molecular weight dispersion index (weight-average molecular weight/number-average molecular weight) of 1.32. As a result, it is possible to confirm that the polymer chains grafted to the composite particles have a uniform chain length.

An electrophoretic dispersion liquid is prepared by using 5 wt. % of the electrophoretic particles 1e (white particles), 0.1 wt. % of a colorant ("Oil Blue N", mfd. by Aldrich Co.), 2.5 wt. % of rosin acid (acidic additive), and 92.9 wt. % of an electrophoretic dispersion medium if ("Isoper H, mfd. by Exxon Corp.). The electrophoretic particles 1e are positively charged by acid-base interaction between the grafted dodecyl polyacrylate and rosin acid. Further, the grafted dodecyl polyacrylate has an expanse in the electrophoretic dispersion medium 1f, thus having also a dispersion function.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 2) for a long time by driving it at a drive voltage of ±10V, the electrophoretic particles 1e are excellent in dispersibility and chargeability, and it is possible to effect clear blue/white display.

EXAMPLE 3-2

A plurality of microcapsules $1i$ each containing an electrophoretic dispersion liquid prepared in the same manner as in Example 3-1 are prepared by in-situ polymerization method. Each microcapsule is formed of urea-formaldehyde resin as a film-forming material. An electrophoretic display device, as shown in FIG. $1(b)$, which is connected with a voltage application circuit is prepared by disposing the plurality of microcapsules $1i$ on a first substrate $1a$ by use of nozzles according to the ink jet method.

When the resultant electrophoretic display device is subjected to contrast display (FIG. 2) for a long time by driving it at a drive voltage of ±10V, the electrophoretic particles $1e$ are excellent in dispersibility and chargeability, and it is possible to effect clear blue/white display.

EXAMPLE 3-3

In 200 wt. parts of aqueous solution containing 2.5 wt. % of anionic surfactant 5 wt. parts of 2-hydroxyethyl methacrylate of formula (3-I) (n=1), ("NEOGEN SC"), 130 wt. parts of styrene, 5 wt. parts of 2-hydroxyethyl methacrylate of formula (3-I) (n=1), and 2 wt. parts of divinylbenzene are emulsified and thereto, 16 wt. parts of aqueous solution containing 7 wt. % of ammonium persulfate dissolved therein is added, followed by emulsion polymerization to obtain a dispersion liquid of polymer fine particles which are provided with hydroxyl group at each surface and have an average particle size of 0.1 μm.

A colorant dispersion liquid is prepared by dispersing 10 wt. parts of carbon black particles (average particle size: 3.0 nm) in 50 wt. parts of aqueous solution containing anionic surfactant (NEOGEN SC) by means of a homogenizer.

In a mixture of the above prepared polymer fine particle dispersion liquid and colorant dispersion liquid, 53 wt. parts of aqueous solution containing 0.7 wt. % of cationic surfactant (lauryltrimethylammonium chloride; "CATNAL", mfd. by TOHO Chemical Industry Co., Ltd.) is added and dispersed by the homogenizer, followed by stirring at 47° C. for 1 hour. When the mixture is observed through an optical microscope, it is possible to confirm formation of agglomeration particles which comprise the polymer fine particles and carbon black particles and have an average particle size of about 0.8 μm.

After stirring at 93° C. for 6 hours, the reaction mixture is gradually cooled to room temperature and washed to obtain black composite particles comprising the polymer and the colorant (pigment). The composite particles have an average particle size of 0.75 μm and a particle distribution CV value of 2.3%.

In accordance with the above described reaction formula (3-I), composite particles to which an atom transfer radical polymerization initiation group is introduced are obtained and then are dispersed in dimethylsulfoxide. In the resultant system, octadecyl methacrylate, cuprous bromide, and (–)-sparteine are added. The reaction system is aerated with nitrogen and subjected to atom transfer radical polymerization at 70 C for a predetermined time. In this case, 2-bromo ethyl isobutylate as a free polymerization initiation group (radical) is added in the reaction system in advance so as to provide an index of molecular weight and molecular weight distribution of a polymer chain grafted to the particle surface.

After the polymerization, the resultant particles are washed and dried to provide objective electrophoretic particles $4e$, which have an average particle size of 0.8 μm and a particle size distribution CV value of 2.4%.

The electrophoretic particles $4e$ are well dispersed in tetrahydrofuran (THF), so that it is possible to confirm that octadecyl polymethacrylate is grafted at the composite particle surface. Further, when a polymer obtained from 2-bromo ethyl isobutylate added as the free polymerization initiation group is subjected to measurement of molecular weight and molecular weight distribution, the polymer has a number-average molecular weight of about 20,000 and a molecular weight dispersion index (weight-average molecular weight/number-average molecular weight) of 1.06. As a result, it is possible to confirm that the polymer chains grafted to the composite particles have a uniform chain length.

An electrophoretic dispersion liquid is prepared by using 1 wt. % of the electrophoretic particles $4e$ (black particles), 0.5 wt. % of rosin acid (acidic additive), and 98.5 wt. % of an electrophoretic dispersion medium $4f$ ("Isoper H, mfd. by Exxon Corp.). The electrophoretic particles $4e$ are positively charged by acid-base interaction between the grafted octadecyl polymethacrylate and rosin acid. Further, the grafted octadecyl polymethacrylate has an expanse in the electrophoretic dispersion medium, thus having also a dispersion function.

The electrophoretic dispersion liquid is injected into a cell by using nozzles according to an ink jet method to provide an electrophoretic display device, as shown in FIG. $4(a)$, which is connected with a voltage application circuit.

When the resultant electrophoretic display device is subjected to contrast display (FIG. 5) for a long time by driving it at a drive voltage of ±10V, the electrophoretic particles $4e$ are excellent in dispersibility and chargeability, and it is possible to effect clear white/black display.

EXAMPLE 3-4

A plurality of microcapsules $4j$ each containing an electrophoretic dispersion liquid prepared in the same manner as in Example 3-3 are prepared by interfacial polymerization method. Each microcapsule is formed of polyamide resin as a film-forming material. An electrophoretic display device, as shown in FIG. $4(b)$, which is connected with a voltage application circuit is prepared by disposing the plurality of microcapsules $4j$ on a first substrate $4a$ by use of nozzles according to the ink jet method.

When the resultant electrophoretic display device is subjected to contrast display (FIG. 5) for a long time by driving it at a drive voltage of ±1V, the electrophoretic particles $4e$ are excellent in dispersibility and chargeability, and it is possible to effect clear white/black display.

EXAMPLE 3-5

Precipitation polymerization is performed at 75° C. in a nitrogen atmosphere by dispersing 120 wt. parts of divinylbenzene, 9.5 wt. parts of methacrylate having an atom transfer polymerization initiation group represented by formula (3-I) shown below, and 2.6 wt. parts of 2,2'-azobisisobutylonitrile (AIBN) in 2400 wt. parts of acetonitrile to obtain polymer fine particles which are provided with an atom transfer radical polymerization initiation group at each surface and have an average particle size of 0.5 μm.

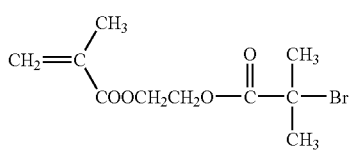

Formula (3-I)

A polymer fine particle dispersion liquid is prepared by dispersing 100 wt. parts of the polymer fine particle in 170 wt. parts of an aqueous solution of 1.5 wt. % of anionic surfactant (sodium dodecylsulfate).

A colorant dispersion liquid is prepared by dispersing 20 wt. parts of azo-type dye particles (Sudan Black B; average particle size: 0.1 μm) in 80 wt. parts of aqueous solution containing anionic surfactant (sodium dodecylsulfate) by means of a homogenizer.

In a mixture of the above prepared polymer fine particle dispersion liquid and colorant dispersion liquid, 85 wt. parts of aqueous solution containing 0.7 wt. % of cationic surfactant ("SANISOL B-50") is added and dispersed by the homogenizer, followed by stirring at 49° C. for 1 hour. When the mixture is observed through an optical microscope, it is possible to confirm formation of agglomeration particles which comprise the polymer fine particles and particles of Sudan Black B and have an average particle size of about 7.5 μm.

After stirring at 88° C. for 5 hours, the reaction mixture is gradually cooled to room temperature and washed to obtain black composite particles comprising the polymer and the colorant (dye). The composite particles have an average particle size of 6.9 μm and a particle distribution CV value of 7.6%.

The composite particles are dispersed in dimethylformamide. In the resultant system, methacrylic acid, cuprous bromide, and (−)-sparteine are added. The reaction system is aerated with nitrogen and subjected to atom transfer radical polymerization at 70 C for a predetermined time. After methacrylic acid is consumed, 1-hexene is added to the reaction system so as to provide a molar ratio of (methacrylic acid):(1-hexene)=1:9, thus forming a grafted polymer chain of block copolymer. In this case, 2-bromoethyl isobutylate as a free polymerization initiation group (radical) is added in the reaction system in advance so as to provide an index of molecular weight and molecular weight distribution of a polymer chain grafted to the composite particle surface.

After the polymerization, the resultant particles are washed and dried to provide objective electrophoretic particles 4e, which have an average particle size of 7.1 μm and a particle size distribution CV value of 8.0%.

The electrophoretic particles 4e are well dispersed in tetrahydrofuran (THF), so that it is possible to confirm that a copolymer of polymethacrylic acid and polyhexene is grafted at the composite particle surface. Further, when a polymer obtained from 2-bromo ethyl isobutylate added as the free polymerization initiation group is subjected to measurement of molecular weight and molecular weight distribution, the polymer has a number-average molecular weight of about 60,000 and a molecular weight dispersion index (weight-average molecular weight/number-average molecular weight) of 1.25. As a result, it is possible to confirm that the polymer chains grafted to the composite particles are a black copolymer having a uniform chain length.

An electrophoretic dispersion liquid is prepared by using 1 wt. % of the electrophoretic particles 4e (black particles), 0.5 wt. % of polyisobutylenesuccinimide (basic additive), and 98.5 wt. % of an electrophoretic dispersion medium 4f ("Isoper H. mfd. by Exxon Corp.). The electrophoretic particles 4e are negatively charged by acid-base interaction between the polymethacrylic acid site of the grafted block polymer and polyisobutylenesuccinimide. Further, the polyhexene site of the grafted block copolymer has an expanse in the electrophoretic dispersion medium, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display (FIG. 5) for a long time by driving it at a drive voltage of ±10V, the electrophoretic particles 4e are excellent in dispersibility and chargeability, and it is possible to effect clear white/black display.

EXAMPLE 3-6

A plurality of microcapsules 4j each containing an electrophoretic dispersion liquid prepared in the same manner as in Example 3-5 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display (FIG. 5) for a long time by driving it at a drive voltage of ±10V, the electrophoretic particles 4e are excellent in dispersibility and chargeability, and it is possible to effect clear white/black display.

EXAMPLE 3-7

In 200 wt. parts of aqueous solution containing 3.2 wt. % of anionic surfactant ("NEOGEN SC"), 130 wt. parts of styrene, 7 wt. parts of ethylene glycol methacrylate (mixture of compounds of formula (3-I) (n=4 and 5); trade name: "Blenmer PE-200", mfd. by NOF Corp.), and 4 wt. parts of divinylbenzene are emulsified and thereto, 17 wt. parts of aqueous solution containing 7.2 wt. % of potassium persulfate dissolved therein is added, followed by emulsion polymerization to obtain a dispersion liquid of polymer fine particles provided with hydroxyl group at each surface and having an average particle size of 0.1 μm.

A colorant dispersion liquid is prepared by dispersing 5 wt. parts of carbon black and 10 wt. parts of Sudan Black B in 55 wt. parts of aqueous solution containing anionic surfactant (NEOGEN SC) by means of a homogenizer.

In a mixture of the above prepared polymer fine particle dispersion liquid and colorant dispersion liquid, 50 wt. parts of aqueous solution containing 0.7 wt. % of cationic surfactant (CATNAL) is added and dispersed by the homogenizer, followed by stirring at 46° C. for 1 hour. When the mixture is observed through an optical microscope, it is possible to confirm formation of agglomeration particles which comprise the polymer fine particles, carbon black and Sudan Black B and have an average particle size of about 2 μm.

After stirring at 97° C. for 5 hours, the reaction mixture is gradually cooled to room temperature and washed to obtain black composite particles comprising the polymer and the colorants (pigment and dye). The composite particles have an average particle size of 1.5 μm and a particle distribution CV value of 3.7%.

In accordance with the above described reaction formula (3-III), composite particles to which an atom transfer radical polymerization initiation group is introduced are obtained and then are dispersed in dimethylformamide. In the resultant system, aminomethyl methacrylated, cuprous bromide, and 4,4-di-(n-heptyl)-2,2'-bipyridyl are added. The reaction system is aerated with nitrogen and subjected to atom transfer radical polymerization at 70° C. for a predetermined time. After aminoethyl methacrylate is consumed, 1-hexene is added to the reaction system so as to provide a molar ratio of (aminoethyl methacrylate):(1-hexene)=1:9, thus forming a grafted polymer chain of block copolymer. In this case, 2-bromoethyl isobutylate as a free polymerization initiation group (radical) is added in the reaction system in advance so as to provide an index of molecular weight and molecular weight distribution of a polymer chain grafted to the composite particle surface.

After the polymerization, the resultant particles are washed and dried to provide objective electrophoretic particles 4e, which have an average particle size of 1.6 μm and a particle size distribution CV value of 3.6%.

The electrophoretic particles 4e are well dispersed in tetrahydrofuran (THF), so that it is possible to confirm that a copolymer of polyaminoethylmethacrylate and polyhexene is grafted at the composite particle surface. Further, when a polymer obtained from 2-bromo ethyl isobutylate added as the free polymerization initiation group is subjected to measurement of molecular weight and molecular weight distribution, the polymer has a number-average molecular weight of about 40,000 and a molecular weight dispersion index (weight-average molecular weight/number-average molecular weight) of 1.27. As a result, it is possible to confirm that the polymer chains grafted to the composite particles are a black copolymer having a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the polyaminoethylmethacrylate site of the grafted block polymer and rosin acid. Further, the polyhexene site of the grafted block copolymer has an expanse in the electrophoretic dispersion medium, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display (FIG. 5) for a long time by driving it at a drive voltage of ±10V, the electrophoretic particles 4e are excellent in dispersibility and chargeability, and it is possible to effect clear white/black display.

EXAMPLE 3-8

A plurality of microcapsules 4j each containing an electrophoretic dispersion liquid prepared in the same manner as in Example 3-7 are prepared by in-situ polymerization method. Each microcapsule is formed of melamine-formaldehyde resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display (FIG. 5) for a long time by driving it at a drive voltage of ±10V, the electrophoretic particles 4e are excellent in dispersibility and chargeability, and it is possible to effect clear white/black display.

EXAMPLE 3-9

An electrophoretic dispersion liquid is prepared by using 5 wt. % of electrophoretic particles 1e (white particles) obtained in the same manner was in Example 1-1, 2.5 wt. % of rosin acid (acidic additive), electrophoretic particles 1e (black particles) obtained in the same manner as in Example 1-5, 1.5 wt. % of polyisobutylenesuccinimide (basic additive), and 88 wt. % of an electrophoretic dispersion medium 1f ("Isopar H, mfd. by Exxon Corp.). The white electrophoretic particles 1e are positively charged and the black electrophoretic particles 1e are negatively charged in the electrophoretic dispersion medium 1f.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 3) for a long time by driving it at a drive voltage of ±10V, the two types of white and black electrophoretic particles are excellent in dispersibility and chargeability, and it is possible to effect clear white/black display.

EXAMPLE 3-10

A plurality of microcapsules 1i each containing an electrophoretic dispersion liquid prepared in the same manner as in Example 3-9 are prepared by in-situ polymerization method. Each microcapsule is formed of melamine-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display for a long time by driving it at a drive voltage of ±10V, the two types of white and black electrophoretic particles are excellent in dispersibility and chargeability, and it is possible to effect clear white/black display.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application Nos. 161687/2004 filed May 31, 2004, 163364/2004 filed Jun. 1, 2004, and 171350/2004 filed Jun. 9, 2004, which are hereby incorporated by reference.

What is claimed is:

1. A process for producing electrophoretic particles containing core particles, comprising:
   (a) a step of forming the core particles;
   (b) a step of providing a living radical polymerization initiation group at a surface of each core particle by reacting a compound having the living radical polymerization initiation group precursor with a functional group as a constituent of the core particles; and
   (c) a step of providing a polymer chain to the living radical polymerization initiation group by living radical polymerization,
      wherein in said step (a) the core particles are formed from polymerizing components by the steps of (i) dispersing the polymerizing components in an aqueous suspension medium, which polymerizing components comprise a colorant, a first polymerizable monomer, a second polymerizable monomer having a functional group which is capable of reacting with the living radical polymerization initiation group precursor, and a polymerization initiator to provide a polymerizable composition; and (ii) subjecting the polymerizable composition to suspension polymerization to form spherical core particles from the polymerizing components.

2. A process according to claim 1, wherein the living radical polymerization is atom transfer radical polymerization.

* * * * *